United States Patent
Corbett et al.

(10) Patent No.: US 9,396,228 B2
(45) Date of Patent: Jul. 19, 2016

(54) METHOD OF OPTIMIZING THE INTERACTION BETWEEN A SOFTWARE APPLICATION AND A DATABASE SERVER OR OTHER KIND OF REMOTE DATA SOURCE

(75) Inventors: Sean P. Corbett, London (GB); Edward Philip Edwin Elliott, West Sussex (GB); Matthew P. Clothier, Chedzoy (GB)

(73) Assignee: DATA ACCELERATOR LTD., London (GB)

( * ) Notice: Subject to any disclaimer, the term of this patent is extended or adjusted under 35 U.S.C. 154(b) by 878 days.

(21) Appl. No.: 13/880,707

(22) PCT Filed: Feb. 22, 2011

(86) PCT No.: PCT/GB2011/050342
§ 371 (c)(1),
(2), (4) Date: Aug. 16, 2013

(87) PCT Pub. No.: WO2011/101691
PCT Pub. Date: Aug. 25, 2011

(65) Prior Publication Data
US 2013/0325927 A1 Dec. 5, 2013

(30) Foreign Application Priority Data

Feb. 22, 2010 (GB) .................................. 1002961.9
Mar. 17, 2010 (GB) .................................. 1004449.3
Jul. 2, 2010 (GB) .................................. 1011179.7

(51) Int. Cl.
*G06F 17/30* (2006.01)
*H04L 29/06* (2006.01)

(52) U.S. Cl.
CPC .... *G06F 17/30371* (2013.01); *G06F 17/30442* (2013.01); *H04L 67/42* (2013.01)

(58) Field of Classification Search
CPC ............ H04L 12/2803; H04L 12/2818; H04L 12/2807; H04L 12/2816; H04L 67/42; G06F 17/30442; G06F 17/3038
See application file for complete search history.

(56) References Cited

U.S. PATENT DOCUMENTS 5,822,747 A * 10/1998 Graefe .............. G06F 17/30463
6,370,522 B1 4/2002 Agarwal et al.
(Continued)

FOREIGN PATENT DOCUMENTS

WO 2005076160 8/2005
WO 2009019104 2/2009

OTHER PUBLICATIONS

Bowman, Ivan T. et al., "Optimization of Query Streams Using Semantic Prefetching," ACM SIGMOD/PODS Conference, pp. 179-190, Jun. 13, 2004.
(Continued)

*Primary Examiner* — Uzma Alam

(57) ABSTRACT

The invention is a method of optimizing the interaction between (i) a client, being an application such as database software, implemented on a computing device, and (ii) database server software implemented on a computing device. Query data is routed from the client to the database server software through an optimization system implemented on a computing device and then response data provided by the database server software is routed to the optimization system. The optimization system analyzes that (or later) query data and, based on that analysis, applies rules to response data provided by the database server software, in order to generate optimized response data to thereby speed up the interaction between the client and the database server software.

27 Claims, 29 Drawing Sheets

(56) References Cited

U.S. PATENT DOCUMENTS

| | | | |
|---|---|---|---|
| 6,604,143 B1 | 8/2003 | Nagar et al. | |
| 6,973,477 B1 | 12/2005 | Martino | |
| 7,467,131 B1* | 12/2008 | Gharachorloo | ... G06F 17/30902 |
| 7,685,194 B2* | 3/2010 | Kabra | ............... G06F 17/30306 707/714 |
| 7,685,437 B2* | 3/2010 | Hacigumus | ....... G06F 17/30463 713/189 |
| 2002/0178161 A1* | 11/2002 | Brezin | .............. G06F 17/30867 |
| 2003/0158842 A1* | 8/2003 | Levy | ................. G06F 17/30445 |
| 2003/0200282 A1 | 10/2003 | Arnold et al. | |
| 2004/0243555 A1 | 12/2004 | Bolsius et al. | |
| 2004/0243799 A1 | 12/2004 | Hacigumus et al. | |
| 2008/0027999 A1 | 1/2008 | Arnold et al. | |
| 2008/0162412 A1 | 7/2008 | Ireland | |
| 2008/0244184 A1 | 10/2008 | Lewis et al. | |
| 2008/0256024 A1 | 10/2008 | Downer et al. | |
| 2009/0125500 A1* | 5/2009 | Arends | ............. G06F 17/30507 |
| 2010/0121968 A1* | 5/2010 | Clark | ............................ 709/230 |
| 2011/0154208 A1* | 6/2011 | Horii | ....................... H04L 67/22 715/736 |
| 2012/0046859 A1* | 2/2012 | Imes et al. | ..................... 701/409 |
| 2012/0131099 A1* | 5/2012 | Sorokin | ........................ 709/203 |
| 2014/0031991 A1* | 1/2014 | Bergman et al. | .............. 700/276 |
| 2014/0101135 A1* | 4/2014 | Yousaf | .............. G06F 17/30442 707/722 |

OTHER PUBLICATIONS

GB Application No. 1011179.7, Combined Search and Examination Report mailed Oct. 12, 2010.

GB Application No. 1011179.7, Examination Report mailed Sep. 6, 2011.

GB Application No. 1103043.4, Combined Search and Examination Report mailed Jun. 22, 2011.

International Application No. PCT/GB2011/050342, International Search Report and Written Opinion mailed May 3, 2011.

* cited by examiner

| | Present | Data Accelerator new model |
|---|---|---|
| Purchase | One-off license purchase for most software or web 2.0 apps like Salesforce offered by subscription | New business models for traditional software. Subscription, rental, rent to own etc. |
| Deploy | CD-ROM or Download with 3rd party push deployment tools | Push or pull self service delivery of apps using Application Streaming |
| Manage | 3rd party tools to manage on-going licensing | Proactive license control and protection for piracy with world class software DRM |
| Support | Problems caused by conflicts when installing additional applications. Large amounts of regression testing required | Application Virtualization protects from application conflicts. Unique configurable virtualization ensures that the application performs like it is locally installed |
| Update | 3rd party patch management solutions required to push patch updates | Patch updates are automatically streamed to users. The patch is only deployed once and all users receive the application changes on the fly |
| Upgrade | Old version has to be removed and the new version deployed as if it were a different/new application | Updates are packaged once and then can be automatically deployed to all users with the old version automatically removed |
| Remove | Software must be manually removed and usage cannot be centrally stopped once a user's license has expired. Uninstalled applications leave many remnants behind causing the system to become cluttered and slow. | Software can be centrally removed as soon as the user's license has expired or the application is no longer needed. There are no traces of the application left behind |

FIGURE 2

|  | Mobile AppStores since C. 2000 | Web AppStores 2007 - Present | Data Accelerator AppStore 2010 - | Data Accelerator Appstore for Entreprise DB Apps 2010 - |
|---|---|---|---|---|
| Content | Large number of small low value apps | Small number of web 2.0 high value apps | Windows higher value apps | Any Windows app including Very high value DB apps |
| End Users | Consumer | SME & Enterprise Customers | SME & Enterprise Customers | SME & Enterprise Customers |
| Main Offerings | Apple iTunes for iPhone PocketGear/Handango and Getjar for white labelled AppStores | Web 2.0 apps: Collaboration, CRM, HR, ERP etc. | Stand Alone Windows Applications: Office, Photoshop, AutoCAD, CorelDraw, Sage, QuickBooks etc. | As Jukebox AppStore but with support for Database Applications that are higher value and more business critical |
| Route to Market | Handset manufacturers and Mobile Operators:<br><br>Apple, Vodafone, T-Mobile, LG, HTC etc. | Normally lead by providers of hosted email – Hosters and SME Telcos:<br><br>BT, 1 & 1, Fasthosts, Telefonica etc. | Providers with Web Appstores looking to go beyond web apps<br><br>Hosters and Telcos As named | Second phase to customers of Jukebox AppStore wishing to extend offering |
| Market Maturity & Size | Mature market worth $4billion in 2009 | Market has been maturing over 2008/2009, Still small | New Market – multibillion $ | New Market – multibillion $ |

FIGURE 3

|  | SME AppStore | SME AppStore with licensing | Enterprise AppStore |
| --- | --- | --- | --- |
| Offering | Take SMEs existing applications and provide them on a self-service web portal | Offer sales of additional software licenses to customer delivered over the self-service web portal. Software publishers can also offer new licensing model; e.g. Rental, Rent to Own, Try and Buy | Self-Service AppStore for Enterprises to efficiently deliver their catalogue of applications to the end users |
| Benefits to End User | Simple management of apps, license reporting, self-service, always up to date, no installation/update support overhead | Simple way to buy apps. Can go up and down with changes in the business. Move from CapEx to OpEx for software, no upgrade costs etc. | Lower costs of deployment, lower costs of support, faster deployments, greater efficiency. |
| Content | Use customers' existing software licenses | Top 20 Apps: MS Office, Adobe Creative Suite, Sage Accounts, Intuit QuickBooks etc. | Enterprises own apps |
| Data Accelerator's Product Technology | Application Jukebox Data Accelerator for DB apps Web Portal eCommerce engine Payment Processing or Telco billing integration | Application Jukebox Data Accelerator for DB apps Web Portal eCommerce engine Payment Processing or Telco billing integration | Application Jukebox Data Accelerator for DB apps Enterprise Web Portal |
| Route to Market | Hosters, ISP's and Telcos | Second phase form SME Managed Apps AppStore | System Integrators/IT services Channel |

FIGURE 4

| DAInstance4AA5888240B44 48e9E20-62A8F70CF595 | DAInstance936C4368DE18405881707 A22FDBCFE59 | DAInstance8F4AEA5AE4D544cd9 B56DF16F7563913 | ServerTime |
|---|---|---|---|
| 1 January 2010 09:43:22.02 | 1 January 2010 09:43:22.04' | 1 January 2010 09:43:23.09 | 1 January 2010 09:43:23.10 |

FIGURE 6

METHOD OF OPTIMIZING THE INTERACTION BETWEEN A SOFTWARE APPLICATION AND A DATABASE SERVER OR OTHER KIND OF REMOTE DATA SOURCE

BACKGROUND OF THE INVENTION

1. Field of the Invention

The field of the invention is methods of optimizing the interaction (e.g. data flow) between a software client application and database server software (or, more generally, software serving/providing data from a remote data source). The invention can be used with traditional legacy applications to make them web delivered; it allows, for example, database applications to be cloud-based, with client applications connecting to a hardware server running the database server software over a relatively slow connection, such as the public Internet.

2. Technical Background

Since the early 1990's there has been a well-known computer architecture called client-server where the client computer runs an application and the server computer typically, runs server software such as database server software. The client applications connect to the database and send requests; they then use the responses to drive the client application.

These client and server systems have had to reside on local network connections or else they perform very slowly or have to be written specifically to handle low network speeds and high amounts of latency. In the last few years there has been a shift in the focus of client-server systems to web based systems where the client connects to a server component which then connects to the database. This means the application can work over slower network links but has a number of disadvantages, the main one being that the application is limited to how much data it can send to the client, so web applications are generally less sophisticated than the original client-server systems. This means that developers have two options, the first is to create client-server systems which gives them the richness of a full application but requires a local network connection to function properly or to write a web based application which means they will work over a remote connection but functionality is poor.

3. Discussion of Related Art

Over the last 3 years especially, new developments have seen a trend whereby software vendors are offering their traditional on-premises software to their customers as a hosted service. This is either being achieved using Server Based Computing or by re-creating a new version of the existing application using Web 2.0 technologies. This is a natural progression as they have moved from core competencies of creating the software, to managing the delivery of the software on behalf of their clients.

SUMMARY OF THE INVENTION

According to a first aspect of the invention, there is provided a method of optimizing the interaction between (i) a client, being an application such as database software, implemented on a computing device, and (ii) database server software implemented on a computing device, the method comprising the steps of:
(a) routing query data from the client to the database server software through an optimisation system implemented on a computing device and then routing response data from the database server software to the optimisation system;

(b) the optimisation system analysing query data and, based on that analysis, applying rules to optimise response data provided by the database server software, in order to generate optimised response data to thereby speed up the interaction between the client and the database server software.

The optimisation system can optionally decode the query data and/or response data to understand the content and/or context as the client and/or server understands it, to provide relevant optimisation. By 'content and/or context' we mean the following: 'content' is the actual query that the client has asked to be run or the request for the data that the client has asked for. 'Context' is whether it is a part of a series of requests and the relationships between the requests. 'Context' also means understanding environmental details such as which server the request is going to, which user and workstation sent the request and a number of other details such as specific network link speeds. Finally by understanding the context of the request, we can see how effective specific rules have been for specific requests to either change the parameters of the rules or even enable or disable them. We use both the content and context to go above and beyond what traditional optimisation systems do to make informed decisions about how best to optimize network traffic.

The client application can, in more general terms, be thought of as a 'Data Request Initiator' or similar and the server software can then be thought of as a 'Data Source' or similar and the invention can be generalised to use these terms as substitutes for the terms 'client application' and 'server software'.

The method may be one in which the optimisation system enables the interaction between the client application/database and the database server software to be sufficiently optimised to enable a practical connection to be made over a slow (e.g. under 5 Mb per second) or high latency (e.g. 5 ms one way) link such as the Internet. The optimisation system may, for example, reduce the amount of processing or operations to be performed by the server software. The optimisation system may also reduce the amount of data needed to pass between the client application and the database server software. The interaction between the application or database and the database server may include any one or more of the following: the flow of data, the cessation of the flow of data, obviating the need for data to flow, or managing the flow of data. In all cases, the flow can be from the client to the optimisation system; from the optimisation system to the server software, from the server software to the optimisation system or from the optimisation system to the client. Also, response data to a query may be received and cached by the optimisation system and then used as a response to a later query; hence, the query data in step (a) and step (b) above may be different queries.

In an implementation, the optimisation system analyses the query data and, based on that analysis, applies rules to the query data, after the content of that query data has been generated by the client. Similarly, the optimisation system analyses the response data provided by the server software and, based on that analysis, applies rules to the response data, after the content of that response data has been generated by the server software.

In summary, the invention relates to a specific technique of optimizing interactions between a client and database server software. Specifically, optimisation is applied to response data provided by the database server software; the software on the client and the software on the server (e.g. the DBMS) may (optionally) be unchanged by the optimisation system. In the typically prior art however, the approach is for the client to send a single query to the database server software, and for the database server software itself to then optimise the content of the response to that query (e.g. in order to minimise the data traffic for that response), and finally for the database server software to send that optimised response to the client. So, in that prior art, there is no optimisation of response data provided by the database server software; instead, the database server software is itself modified to do all of the optimisation. This approach requires bespoke coding of database server software. (We note for completeness that this does not exclude the possibility of optimisation of response data being done, in an implementation of this invention, at the database server software as well). The advantage of applying optimisation after the content of the response data has been generated and provided by the database server software is that it removes the need to gain access to how the database server software is generating its responses. The database server software (e.g. the DBMS described above) remains "substantially unchanged.

And this differs from say conventional compression because conventional compression is applied crudely to all query/response message traffic between the client and server—whereas in an implementation of the present invention, there would be an analysis of the query data and, based on that analysis, compression related rules are then applied to the response. That is a very different approach.

An implementation, called Data Accelerator, from Data Accelerator Limited, includes one or more of the following features:
- the database server software is cloud-based, or on a local network, or on a WAN or the database server is local to the client application.
- the client application or database is deployed, managed or updated to end-users using application virtualisation software.
- allows the number of database server software computing devices or the load on the or each database server software computing device required, to be reduced.
- allows the load on the or each database server computing device to be balanced or redirected in cases of fail-over.
- the optimisation system is added to an existing (e.g. legacy) database client application or database server software, and the structure of the tables and/or files of the database running on the database server software, are each substantially unchanged by the optimisation system.
- the optimisation system is not an integral part of the client application or the database server software or implemented by bespoke coding to the client application or the database server software.
- the optimisation system changes either the application/database or the database server software, but not both.
- the optimisation system is implemented in software and includes a client application or a server application.
- the optimisation system is implemented in software and includes a client application and a server application.
- the optimisation system is implemented in hardware.
- the optimisation system is located between the application/database and the database server software.
- the optimisation system is located on the application/database and/or the database server software.
- the optimisation system includes multiple instances of individual optimisation systems that each provides optimisation services.
- the multiple instances include a chain or mesh of peers.
- the path through the multiple instances of individual optimisation systems is variable.
- the multiple instances of individual optimisation systems are able to communicate amongst themselves.
- the multiple instances of individual optimisation systems share diagnostics and performance information.
- the multiple instances of individual optimisation systems each understand where they are in the chain or mesh of peers between initiator and the server.
- the optimisation system can dynamically determine how effective or detrimental a specific rule is and can choose to vary the applied rules to find the optimum performance enhancement.
- the server software is serving data to client; it may for example be a SQL or MS SQL server.
- the query and response data includes DBMS (Database Management System) requests and responses.
- the optimisation system reduces the number of DBMS requests and/or responses.
- the rules are accessed through a rules engine.
- the rules engine decides when and how to apply rules.
- the rules define caching of queries.
- the rules define how to obtain diagnostic, performance, cached data, cachability information.
- the rules define how to configure other rules.
- the rules define peer to peer caching of queries.
- the rules define compression.
- the rules define encryption.
- the rules define predictive pre-fetching.
- the rules define string replacement.
- the rules define query batching.
- the rules define re-routing to specific database servers for load balancing or fail-over.
- the rules define request modification.
- the rules pre-validate requests.
- the rules define auditing and logging.
- the rules automatically tune, adapt or improve.
- the rules define how to re-cache queries
- the rules define how to split large buffers of data into separate TCP streams
- the rules define how to merge small buffers of data to create a single TCP packet
- the rules define how to return simple responses
- the rules can be selectively enabled or disabled based on factors such as initiator and server addresses or locations, time of day, configuration, server load.
- the rules are applied at different points in the request/response stream.
- the rules are custom rules.

According to a second aspect of the invention, there is a computer system including:
(a) remotely accessible database server software implemented on a computing device;
(b) a client, being an application such as database software, implemented on a computing device connected over a network to the database server, and
(c) an optimisation system implemented on a computing device, in which query data is routed from the client to the database server through the optimisation system and then response data provided by the database server software is routed to the optimisation system; and in which the optimisation system analyses the query data and, based on that analysis, applies rules to optimise the response data provided by the database server, in order to generate optimised response data to thereby speed up the interaction between the client and the database server software.

In a third aspect of the invention, there is a computer software that, when running on a computing device, enables the optimisation of the interaction between (i) a client, being an application such as database software, implemented on a computing device, and (ii) database server software implemented on a computing device, and in which query data is routed from the client to the database server software through an optimisation system running the computer software and then response data provided by the database server software is routed to the optimisation system;

and in which the software when running on the optimisation system analyses the query data and, based on that analysis, applies rules to the response data provided by the database server software, in order to generate optimised response data to thereby speed up the interaction between the client and the database server software.

In a fourth aspect, there is computer readable media storing computer software as defined above.

According to a fifth aspect of the invention, there is provided a method of distributing software applications, comprising the steps of:
(a) providing multiple software client applications accessible in an application store;
(b) routing query data between one or more of the software applications and a database server, via a WAN such as the Internet, and through a data optimisation system that applies rules to speed up the interaction between the or each software client application and the database server software.

The optimisation system may operate as defined above.

In this fifth aspect, the software applications may include database client applications and may be distributed to end users' device (e.g. a PC or a mobile device); the software applications may also be distributed to system integrators. The database server may be cloud-based. The software applications may be deployed, managed or updated to end-users using application virtualisation software.

According to a sixth aspect of the invention, there is provided a method of optimizing the interaction between a file requestor and a file server, comprising the steps of:
(a) routing query data between the file requestor and the file server through an optimisation system;
(b) the optimisation system analysing the data and applying rules to the data to speed up the interaction between the file requestor and the file server.

The optimisation system may operate as defined above.

According to a seventh aspect of the invention, there is provided a method of optimizing the interaction between a web data requestor and a web server, comprising the steps of:
(a) routing data between the web data requestor and the web server through an optimisation system;
(b) the optimisation system analysing the data and applying rules to the data to speed up the interaction between the web data requestor and the web server.

The optimisation system may operate as defined above.

According to an eight aspect of the invention, there is provided a method of optimizing the interaction between a Web-based Distributed Authoring and Versioning (WebDAV) requestor and a WebDAV server, comprising the steps of:
(a) routing data between the WebDAV data requestor and the WebDAV server through an optimisation system;
(b) the optimisation system analysing the data and applying rules to the data to speed up the interaction between the WebDAV data requestor and the WebDAV server.

The optimisation system may operate as defined above.

According to a ninth aspect of the invention, there is provided a method of optimizing the interaction between an application streaming requestor and an application streaming server, comprising the steps of:
(a) routing data between the application streaming data requestor and the application streaming server through an optimisation system;
(b) the optimisation system analysing the data and applying rules to the data to speed up the interaction between the application streaming data requestor and the application streaming server.

The optimisation system may operate as defined above.

According to a tenth aspect of the invention, there is provided a method of optimizing the interaction between a SOAP requestor and a SOAP server, comprising the steps of:
(a) routing data between the SOAP data requestor and the SOAP server through an optimisation system;
(b) the optimisation system analysing the data and applying rules to the data to speed up the interaction between the SOAP data requestor and the SOAP server.

The optimisation system may operate as defined above.

According to an eleventh aspect of the invention, there is provided a method of optimizing the interaction between an email requestor and an email server, comprising the steps of:
(a) routing data between the email data requestor and the email server through an optimisation system;
(b) the optimisation system analysing the data and applying rules to the data to speed up the interaction between the email data requestor and the email server.

The optimisation system may operate as defined above.

According to a twelfth aspect of the invention, there is provided a method of optimizing the interaction between a document requestor and a document management system, comprising the steps of:
(a) routing data between the document data requestor and the document management server through an optimisation system;
(b) the optimisation system analysing the data and applying rules to the data to speed up the interaction between the document data requestor and the document management system server.

The optimisation system may operate as defined above.

According to a thirteenth aspect of the invention, there is provided a method of optimizing the interaction between a data requestor and a data server, where the server is any software component that provides data to a requestor, comprising the steps of:
(a) routing data between the data requestor and the data server through an optimisation system;
(b) the optimisation system analysing the data and applying rules to the data to speed up the interaction between the data requestor and the data server.

The optimisation system may operate as defined above.

According to a fourteenth aspect of the invention, there is provided a method of optimizing a number of different types of traffic to provide a replacement to traditional virtual private networking solutions currently in place with not only the traditional benefit of an encrypted connection to network data but also an optimized connection to provide significantly enhanced performance for users.

The optimized connection may use an optimisation system as defined above.

According to a fifteenth aspect of the invention, there is provided a method of optimizing and streaming an application using App Accelerator and Data Accelerator in conjunction so that the App Accelerator connects through Data Accelerator to a file data source, either WebDAV, SMB, CIFS, FTP or equivalent to request blocks of files to be used and Data Accelerator provides its full set of rules to optimize the downloads. 'App Accelerator' is a proprietary application virtualisation technology which we will describe later; however, note that we the use the term 'App Accelerator' in the broadest sense as the generalisation of the specific application virtualisation technology we describe. As such, it covers not only the specific implementation that we describe of that technology, but any kind of application virtualisation technology. Likewise, we use the term 'Data Accelerator' in the broadest sense as the generalisation of the data acceleration technology we describe. As such, it covers not only the specific implementation that we describe of that technology, but any kind of data acceleration technology.

According to a sixteenth aspect of the invention, there is provided a method of having a truly roaming application for users using App Accelerator. Typically when an application is used, it writes certain configuration information to the local machine such as the size of the window after a user resizes it and the position of toolbars and other user details. Currently when a user moves to another machine and uses the application, they need to re-setup their standard choices or user preferences. Using App Accelerator when the application writes such configuration information, the information is synchronized with the portal server and so when the user moves to another machine anywhere in the world and runs the application, the settings are automatically synchronised so it is as if the exact same application and configuration have followed the user to their new computer.

According to a seventeenth aspect of the invention, there is provided a method of making documents available locally while storing them at a remote data source. Current implementations of document stores typically fall into two categories, the first creates a copy of the store on each users machine by copying all documents in the store locally, and as changes are made to the local store the files are uploaded to the server. The second category is where users download documents as they require, modify and then upload the documents. Neither method is a perfect solution, the first requires a significant amount of local storage and for large data stores, this is often impractical. The second relies on users updating the remote files which often does not happen. When using the Data Accelerator to accelerate traffic to a network share over a slow link, it means that the users access the files as if they were local but actually they are remote so removes the problems seen with both of the existing solutions. This is achieved by storing the files on a network location and using WebDAV, SMB, CIFS, FTP or equivalent to request blocks of files to be used and Data Accelerator provides its full set of rules to optimize the downloads Benefits of the Data Accelerator Implementation
Reduced Number or DBMS Servers for an Enterprise The main benefit to an organisation is that when a DBMS request is sent, it can be served faster and more efficiently with as minimal impact or load on the actual DBMS as possible. The reason that the load on the DBMS needs to be minimised is that they are traditionally expensive systems to operate, either through licensing or the hardware that is required in order that the responses can be served quickly enough. By minimising load, Data Accelerator can lead to a significant reduction in the number of DBMS servers that an organization needs to run and can therefore lead to a significant reduction in both costs and the environmental impact of running those servers.

Database in the Cloud or Database as a Service

The second main benefit is because of the extra work that goes on at the network (and/or client) level like caching, compression or string replacement, it is now possible to locate the DBMS system over a slow link, either a secured link to another site or over the internet to a cloud. Because of the nature of the environment, the DBMS system can be scaled cheaply. With the network optimization that Data Accelerator carries out, moving DBMS systems into the cloud can be made a reality for both new and legacy systems.

Benefits of the Data Accelerator when Used as a VPN

It is important to understand that by accelerating traffic at the application level, combined with encryption and network level optimization we can provide a secure connection between two points and a level of optimization that traditional VPN solutions do not provide, thereby making the primary use of VPN's, i.e. remote workers, viable in a large number of situations where current solutions are unable to work or users suffer poor or sub-optimal performance.

BRIEF DESCRIPTION OF THE DRAWINGS

FIG. 2 shows areas impacted by changes in a software life cycle; contrasting known approaches with that possible using an implementation of the invention.

FIG. 3 shows new delivery models emerging and Data Accelerator's proposition.

FIG. 4 shows Data Accelerator's Product Offering to service the markets.

FIG. 6 shows a response data set.

DETAILED DESCRIPTION

Section A: Overview

Figure 1:
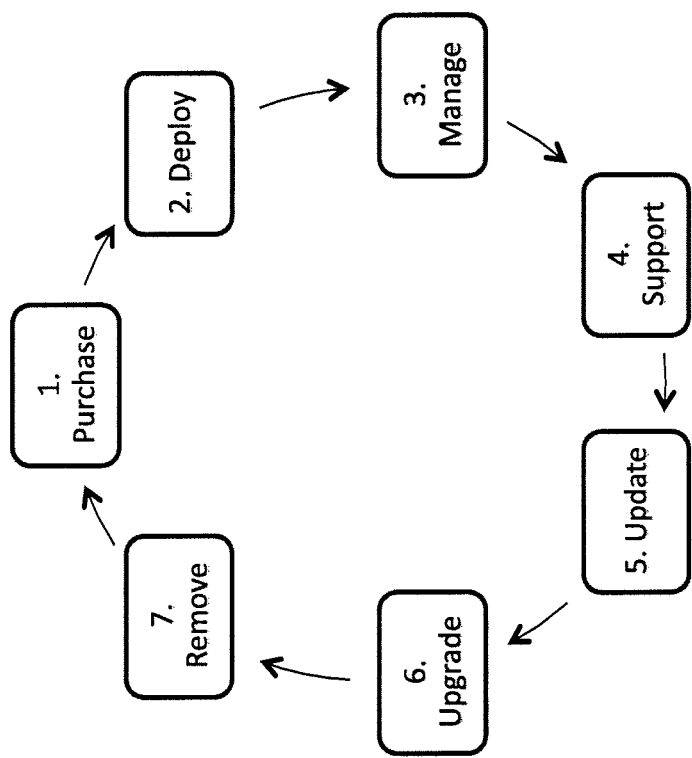
FIG. 1 shows areas impacted by changes in a software life cycle.

A problem facing current DB based apps is that they are written on the assumption that the client is on the same LAN as the DB. Because the LAN is assumed to be fast, there is no optimization of the data traffic. Many people now want to deliver their DB apps over the Internet, with their DB servers somewhere in the cloud. Software as a Service apps all require this, for example. However a DB app, which was designed with a server and client talking to each other over a high bandwidth LAN, will be very slow when working over the Internet.

The conventional solution is to analyse the traffic between the client and server and get rid of bottlenecks using bespoke coding. (We generally use the term 'server' to refer specifically to the server software as opposed to the hardware computing device; on occasion we will be referring to the hardware device, but the context will generally make the meaning plain). This approach is costly as it involves understanding a detailed level of knowledge of the data calls and requires the bespoke performance coding is kept up to date with all changes in the rest of the application.

One of the broad ideas in Data Accelerator is to re-direct traffic between a client and DB (e.g. SQL) server so that the traffic passes between a small app on the client and a server component that is on a LAN with the DB server. The small app and the server component apply traffic optimization and traffic shaping and together form an optimisation system as defined earlier. This should yield a generic solution that can retro-fit to any legacy DB that needs to migrate to the cloud or deliver software as a service.

Five core technologies are used by the optimisation system (e.g. small app on the client and a server component):
1. Compression and encryption
2. Caching data on each client, with peer-to-peer transfer of cached data between clients. The optimisation system (e.g. DB side Server Component) maps out which clients are on the network and what data they each cache and can hence restrict itself to delivering just deltas to clients as needed. It can also trigger the peer-to-peer transfer of data between clients—many of which will be on the same fast LAN.
3. Predictive pre-caching in which the optimisation system (e.g. DB side Server Component) understands the likely flow of client side interactions and can hence predict what data the client is likely to request and can then send it in advance to the client side cache. This is an adaptive process, learning incrementally, for each application, the likely interaction flow by monitoring actual usage.
4. SQL (or other DB) string replacement by indexing lengthy strings with compact references. The optimisation system (e.g. Server Component) dynamically learns what SQL strings are being used frequently and can then tell the client to stop using specific full strings and instead start using a compact reference. When the client adopts that compact reference, the optimisation system (e.g. server component) can then interpret it correctly.
5. General Protocol efficiency improvements—for example
5a. Parallel TCP Streams When sending large chunks of TCP data, it is often inefficient over a network with high latency and also high bandwidth to send a series of packets in serial as the time it takes to transfer the data over the internet is at least (SizeOfData/Maximum TCP Packet Size)*(Time To Send Packet Over Internet+Time To Send Acknowledgement), so where we need to send 10,000 bytes, assuming the Maximum TCP Packet Size is 1460 bytes and the network links we are using have a combined latency of 50 ms in each direction, the time to send the data and receive the TCP acknowledgement is:

$(10,000/1460)*(50+50)=~685$ ms

If instead, the data had been split into chunks no larger than 1460 and sent at the same time, we would in effect end up with a time to transfer of:

$(1460/1460)*(50+50)=100$ ms

This scales out in that you can send as many parallel packets as there is available bandwidth meaning that it takes roughly the same amount of time to send 10,000 bytes as opposed to 100,000 bytes as long as there is the available bandwidth. The exact figures do not reflect the actual situation of using the internet as different packets will be routed over different links but the process of splitting packets can have a dramatic impact on performance.

5b. Cross Connection Packet Merging

The time it takes to transfer data over the internet is determined by the amount of latency involved and to some extent the amount of available bandwidth, for example it takes roughly the same amount of time to transfer a single byte as opposed to 1000 bytes as there is an overhead for each packet, as opposed to each byte. Typically the maximum size of a single TCP packet over the internet is 1460 bytes, if Data Accelerator has to transfer two small packets over two separate connections at the same time, the packet merging rule could, create a single packet and sends it upstream to be split by another instance of the Data Accelerator. Although the latency involved is the same, instead of sending two small packets in parallel, we half the bandwidth requirement while leaving the latency overhead the same by sending the data in a serial fashion, so although we do not transfer data faster, we save bandwidth which can be used by other connections where they would possibly have to wait before sending the data.

5c. Network Protocol Switching

This is a technique to improve performance of existing TCP connections, for example in a network with a very high latency but very high reliability it might be that the time for the client to receive the TCP acknowledgements is too slow so instead the Data Accelerator sends the data using UDP as no downstream acknowledgement is required, then the Data Accelerator could send a checksum for the data with each packet and its own packet identifier so if data is not received or not received in order the upstream Data Accelerator instance can re-request the missing data, occasional acknowledgements can be included which although add to the latency, do not necessarily happen on the same connection as the data so do not need to hold up the flow of data.

Here these technologies are used individually or collectively in the context of re-directing traffic between a client and DB (e.g. SQL) server software so that the traffic passes between an optimisation system (e.g. a small app on the client and a server component) that can apply traffic optimization and traffic shaping. More generally, in Data Accelerator, we have (i) a client, being an application such as database software, implemented on a computing device, and (ii) database server software implemented on a computing device, and Data Accelerator works by (a) routing query data from the client to the database server software through an optimisation system implemented on a computing device and then routing response data from the database server software to the optimisation system; (b) the optimisation system analysing query data and, based on that analysis, applying rules to optimise response data provided by the database server software, in order to generate optimised response data to thereby speed up the interaction between the client and the database server software.

As noted earlier, the present invention is implemented in a system from Data Accelerator Limited: Data Accelerator is pioneering a new paradigm of software delivery and management that will go further than any that exist today. Data Accelerator's solution will permit businesses to purchase not just the limited selection of web 2.0 applications currently available, but to have an AppStore for any kind of business, conceivably delivering ALL of the applications needed by a business to run a business, including database applications. The benefits, which are explained below, are far-reaching and fundamental, going beyond the point of increased efficiencies in initial purchase and delivery. Achieving this goal, particularly if a relatively slow (e.g. under 5 Mb per second) network is used, requires new ways of optimising the flow of data across the network—for example across the network that links a database client application obtained from the App Store and the database server for that application.

One of the key reasons businesses have moved to buying from web AppStores, is for the simplicity of both purchase and deployment, auditing and updating. But critically, with the implementation of application virtualisation, they are doing so to reduce the cost of the on-going day to day management of these applications on the desk-top, even more so for very large enterprises. Now, by enabling all of their business applications, including those that are not web 2.0 apps, to be delivered through web stores and streamed from centrally hosted databases, businesses can get all of the benefits associated with web 2.0 applications for the rest of their inventory of software. This has a huge impact for almost any company's entire legacy IT infrastructure. The areas most impacted by these changes in a software life cycle may be those shown in FIG. 1 and in FIG. 2. FIG. 2 contrasts the present approach to that possible with Data Accelerator's approach for each step in the lifecycle.

What Will Data Accelerator Offer the Market?

Data Accelerator offers the ability to go to any Windows, or other non-Windows PC or device (e.g. Mac, Linux, Android, iOS etc.) anywhere in the world and launch a legacy application, possibly from a web portal, connecting to a remote data source, without any on site infrastructure, on any internet connection and the application will work at the same speed as a locally served application with full access to all local devices, printers and other applications.

Traditionally, in order to benefit from a central database or data store, and its associated reduced total costs of ownership and other benefits, it is required that both the server and client side processing are performed on the central servers. This is normally achieved using either a Web (or sometimes referred to as a Web 2.0) application or by using server based computing technologies such as Microsoft Terminal Services or Citrix XenApp (formally Citrix Presentation Server); both options have significant downsides. Web applications suffer from a limited or poor user interface and user experience as the limitations of web application development technologies means that the user interface cannot be as rich or perform as well as a native client application. For existing software publishers it is also a very time consuming and extremely expensive process to re-develop existing applications into Web applications; and once this is done, although the software publisher benefits from a centralised database or data store, at best, they get the same end user functionality and often significantly less functionality. Server based computing takes the approach of running the existing database software centrally and also running the client application software on central servers. This allows existing applications to be centralised without re-development but with the significant downside of problems with integration between the central application and the end users local devices (e.g. Printer, scanner and USB devices) and other local applications with the high costs and complexity of running the client computing on server infrastructure. This is due to the centralised application running on one computer (in the central location) and all devices and other applications running on the local end users computer.

As Data Accelerator is able to reduce the effect of low bandwidth or high latency connections on the performance of an application, it makes it practical for the client application to be run on the end users device, where it was originally intended and designed to run, and the server to be hosted centrally, possibly in a public or private cloud. Without Data Accelerator the performance between the local application and the central server would be too slow for acceptable use. This presents one final problem, which is that the local application needs to be managed and maintained, this is discussed later using the App Accelerator technologies in combination with Data Accelerator to deploy and manage the client application. The combined effect gives the software publisher the ability to deploy and manage their software centrally, with a central database or data store, without any re-development of the application or any device or application integration problems with the same performance as if the application were being served and installed locally.

Data Accelerator's AppStore will enable any application, including database applications, to be delivered over the Internet or Intranet giving users access to their applications and their data on any Internet connection from any computer. For small, medium and large enterprises this transition provides an enormous cost reduction to their existing technology infrastructure and significantly increases the productivity of their users. (For the purpose of broad definition, an SME will typically use a publically run AppStore and hosting in public cloud, whilst an enterprise will typically use an internal privately run AppStore and private cloud). The software publisher regains control of the distribution of the software and is less dependent on having competent channel partners to represent the product; plus the software publisher will realise a larger profit margin by streamlining the number of partners in the channel and making it easier to deploy the application.

The ability to centrally manage the customer's application from the initial deployments through the lifecycle of patch updates and version upgrades in a simple and centralized way significantly reduces the on-going cost for supporting their customers. This requires no interaction or disruption for the end users, with their applications always being up to date. Additionally because the application is centrally distributed no local IT resources are required to support the user. To run the application the user just visits a portal and in one click the application begins downloading or streaming. The application becomes zero touch for IT and self-healing, as should a failure occur, a simple re-boot returns the application to a "Gold Image" without loss of data.

Licensing and Digital Rights Management (DRM)

The application is deployed in a virtual layer on the client device which offers very strong Digital Rights Managements, ensuring that the application cannot be copied or pirated. The application is controlled centrally allowing the publisher to activate or deactivate applications remotely subject to authentication procedures. New transactional business models like SaaS or Rent to Own can now be adopted for these applications which were not previously available to the software publishers. This gives the publishers competitive advantage as the legacy application has all the rich functionality of years of investment in its IP but it can now also offer the same new business models of Web 2.0/Cloud applications.

Roaming Users

Any authenticated user can log on to launch the application from any device and the application and data will stream down on demand, as well as optionally synchronising the user's personal settings for the application, once the user has finished with the application then all trace of the application, application settings and data can be deleted ensuring data security but providing full roaming capability for users wherever they are. For the IT administrator the application is zero touch, and self-healing, so there is minimal support or administration overhead. This provides greater flexibility for the users and reduces overheads for IT.

Centralized Database Management for Backup and Maintenance Tasks

With multi-site locations, each server farm has to have its own Systems Administrator to perform back-ups and maintenance. Every location will have the same back-up and maintenance process being performed by local system administrators, whereas with Data Accelerator the process is centralised and simplified. One server farm is maintained, one back-up procedure to run, with just one local systems administrator to manage it. Centralising the database provides a more cost effective and efficient way to manage the data and server farm.

Disaster Recovery

The conventional DR solution is to replicate the working environment in the form of a fall-back office which can be made live in the event of a disaster and the personnel would relocate to the fall-back office. This is very costly to support and maintain and even in the event of a disaster there is a lag time to switch environments. With the Data Accelerator solution of Data Accelerator & App Accelerator all data and applications can be served up to any other Windows environment in a few minutes at vastly reduced cost, and with a much greater flexibility for the users. For example in the event of a disaster, the user can work from a static or roaming device and the application with all the data, will stream down to the user and maintain the full functionality that they had whilst in the original work place.

With reference to FIG. 3, the new delivery models emerging are shown in the columns headed "Mobile AppStores since C. 2000" and "Web AppStores 2007-Present", and Data Accelerator's proposition is shown in the columns headed "Data Accelerator AppStore 2010" and "Data Accelerator AppStore for Enterprise DB Apps 2010" of the Table.

In FIG. 4, Data Accelerator's Product Offering to service the markets is identified in the Table. Key to a business oriented AppStore is the provision of database applications. In the past, database applications have required a high bandwidth (e.g. over 5 MB per second) LAN linking a powerful server with multiple client computers. That approach is however not relevant to database applications bought from an AppStore since those database applications will typically have to operate efficiently over a relatively slow connection such as the Internet or wireless connectivity such as GPRS.

How are we Doing this?

Data Accelerator Limited is developing its own proprietary technology, Data Accelerator, for accelerating and optimizing the flow of data between any application and a database server. Specifically the solution will enable practical access to a database application across a wide area network (WAN) or the Internet that is not currently possible or is prohibitively slow at present. Data Accelerator is the only known product of its type. Data Accelerator may also make use of Application Virtualisation. Together with Data Accelerator this will create the first of its kind in a data flow optimization model that works for the cloud, capitalising on and meeting three principal global market opportunities:

1. A PC application store for any Windows application.

This SME based offering will be targeted at Telephone Company (Telco) operators, hardware vendors, retailers and Independent Software Vendors (ISVs) to re-sell to their end users. On top of streaming applications to users moreover, we have the added advantage of being able to deliver and store end-user data in the public or private cloud because of Data Accelerator (explained below).

2. A private application store for enterprises targeted at system integrators to resell to their customers, managed centrally from a private or public cloud.

Data Accelerator's solution will aid the sales process and return on investment (ROI) of a system integrator's own products or services, especially where they are managing desk-tops, by reducing the cost and complexity of delivering applications to enterprise users and the overheads of administering and paying for expensive server set-ups.

3. An independent App Store targeted at Independent Software Vendors (ISVs) for new and existing markets.

Those ISV's that have a database back end on their application will normally suffer from complex and long sales cycles and high costs of implementation as each time they sell their software their customer also has to make an additional investment in the database infrastructure to support the application.

If the ISV uses Data Accelerator however, they can run a central hosted database in the Cloud for their customers to use. This is delivered at a much lower cost to the end customer due to economies of scale and it means that the ISV only has to focus on selling the benefits of their software. Then the ISV can use an Application Virtualisation technology to deploy their client software and updates to the customer over a WAN. This gives complete control over licensing to the ISV and it means that there is a very simple implementation process for the customer with a lower Total Cost of Ownership.

A hypothetical, fictional example of an ISV that has this kind of problem is Bert's Glasses, which supplies replacement car windscreens. A significant part of their business involves gathering data on vehicles and then making that available to car traders, insurers and car repair centres. The software they provide for car repair centres is called Glassbert and has a client application and a back end database that stores the car repair costing data for quoting to insurers. This application is not appropriate to become a web-based application due to the need to communicate with local large files, such as photos of the repairs themselves. Currently Bert's Glasses requires each customer to install and maintain their own SQL (Structured Query Language) server at each customer office. This presents a large problem for them during the sales cycle to a new customer since car repair centres have little or no information technology (IT) knowledge and to maintain such a server in each office costs around GBP 1,000 a year for a small SQL server. Also, the current set-up makes updating the data a very complex and expensive process involving sending out a CD ROM to 1,000 customers every month to update the database. Bert's Glasses have previously investigated providing a central database for their customers and know that this would reduce their sales cycle and significantly reduce their costs of updating and supporting those customers. However their investigations correctly found that the database would be too slow to be used over a WAN (either a virtual private network (VPN) or internet) so the only option would be to use Citrix XenApp (Presentation Server) to serve the application remotely. This would be prohibitively expensive for them and add around GBP 600 per user to the cost of their application. Given that Bert's Glasses has 1,000 customers with approximately 10,000 users each charged GBP 1000 per year, this is over a 50% increase in the cost of implementing such a solution—many GBP millions.

The other area where Data Accelerator can help ISVs is if they have a web-based application. Any web-based application has a back end database and as the ISV scales up the number of users they also have to scale up the database infrastructure; this comes at a cost that can be very high.

Data Accelerator can be used to scale the number of users that can use a web based application without needing to increase the number of database servers. This can reduce the cost for the ISV and improve the performance of the web application for the user.

Section B: Data Accelerator
What does it do?

Data Accelerator optimizes data traffic between a data source server software and any client application.
How it Works?

The Data Accelerator data flow optimisation system will analyse the specific SQL traffic and perform various proprietary optimization techniques to reduce the amount of information (e.g. data requests) sent to the SQL server or response data sent back to the client via the optimisation system and the amount of processing required of that server. Furthermore, Data Accelerator is a totally transparent solution that can be retrofitted on any database application to improve speed of response times and overall query performance over a WAN. This significantly increases the size of the addressable market. An added benefit in terms of ease of adoption is that Data Accelerator and Application Virtualization software can be implemented incrementally rather than a wholesale replacement of systems and methods at a huge cost, e.g. Virtual Desktop Infrastructures (VDI).
What does this Mean for Enterprises?
Reduced Number of DBMS (Database Management Servers) for an Enterprise The main benefit to an organisation is that when a DBMS request is sent, it can be served (i.e. responded to) faster and more efficiently with minimal impact or load on the actual DBMS. The reason that the load on the DBMS needs to be minimised is that they are traditionally expensive systems to operate, either through licensing or the hardware that is required in order that the responses can be served quickly enough. With Data Accelerator we can, in one variant, use the far cheaper and more abundant processing power of the users' PC (e.g. the optimisation system can include a client component running on client PCs, taking advantage of the computational power of those PCs). By minimising load, Data Accelerator can lead to a significant reduction in the number of DBMS servers that an organization needs to run leading to a significant reduction in both costs and the environmental impact of running those servers.
Databases in the Cloud or Database as a Service The second main benefit is because of the improvements that Data Accelerator gives at the network level (such as caching, compression or string replacement) it is now possible to locate the DBMS system over a slow link, either a secured link to another site, a VPN or over the internet to a cloud. Because of the nature of the environment, the DBMS system can be scaled cheaply. With the network optimization that Data Accelerator achieves, moving DBMS systems into the cloud can be made a reality for both new and legacy systems.
How is the Benefit Measured?

The benefit will depend on the application itself but in the real world would allow a financial application that would normally takes a user 10 minutes to log into over the internet using conventional techniques to be reduced to a few seconds or allow a large enterprise to reduce their number of severs by up to 10 times. With each customer, the exact saving will be accurately demonstrable with live data feedback that can measure and quantify the saving and efficiency benefit on each application for every client in real time. Because Server Virtualisation only reduces the number of physical hardware boxes but not the amount of computing power required, the benefits accruing through Data Accelerator will be a much greater improvement. Server Virtualisation has swept the market over the last 5 years, hence the growth of VMware and Citrix, showing us the potential of the market for fast adoption.
Where and how Will it be Applied and Installed?

The server software will be a standalone application that can be installed on either the SQL server or any other server on the same local area network (LAN) segment of the SQL Server. The client side will be able to be installed as an application or as a client install on each PC, or a combination of both. The client will be installable in user mode, meaning without the requirement for Administrator rights on the end PC. IT departments will of course also be able to use Data Accelerator for all their corporate database applications to improve performance, extending the use of applications to home users and branch offices and reduce the costs of their server infrastructure or in fact to any employee who needs to be mobile.
What Techniques Lie Behind the Implementation of the Invention?

The SQL data will be cached and we deploy techniques to automatically pre-fetch the subsequent SQL data that is needed for any given application query. When responding to a query, the optimisation system (e.g. client) will get the results from a local client's cache if available and only the differential will be sent over the WAN. The key part of this method is that the SQL server and application will not be aware of the optimization taking place. Data Accelerator is a totally transparent solution that can be retrofitted on any database application to improve speed of response times and overall query performance over a WAN. Additionally the Data Accelerator is able to optionally decode the query data and response data to understand the content and/or context as the client and server understands it, to provide relevant optimisation based on single or related queries. It can be contrasted with the typical prior art where the approach is for the client to send a single query to the database server software, and for the database server software itself to then optimise the content of the response to that query (e.g. in order to minimise the data traffic for that individual response), and finally for the database server software to send that optimised response to the client. So, in that prior art, there is no optimisation of response data provided by the database server software; instead, the database server software is itself modified to do all of the optimisation. This approach requires bespoke coding of database server software. The advantage of applying optimisation after the content of the response data has been generated and provided by the database server software is that it removes the need to gain access to how the database server software is generating its responses. The database server software (e.g. the DBMS described above) remains "substantially unchanged". This of course massively increases our addressable market since it will be applicable to all historic database applications currently running. It achieves this by rerouting the SQL traffic that normally flows directly between the client application and the SQL server. With Data Accelerator now the SQL traffic flows via our additional client and server application so that we can dynamically add in optimization techniques to the communication.

Figure 5:
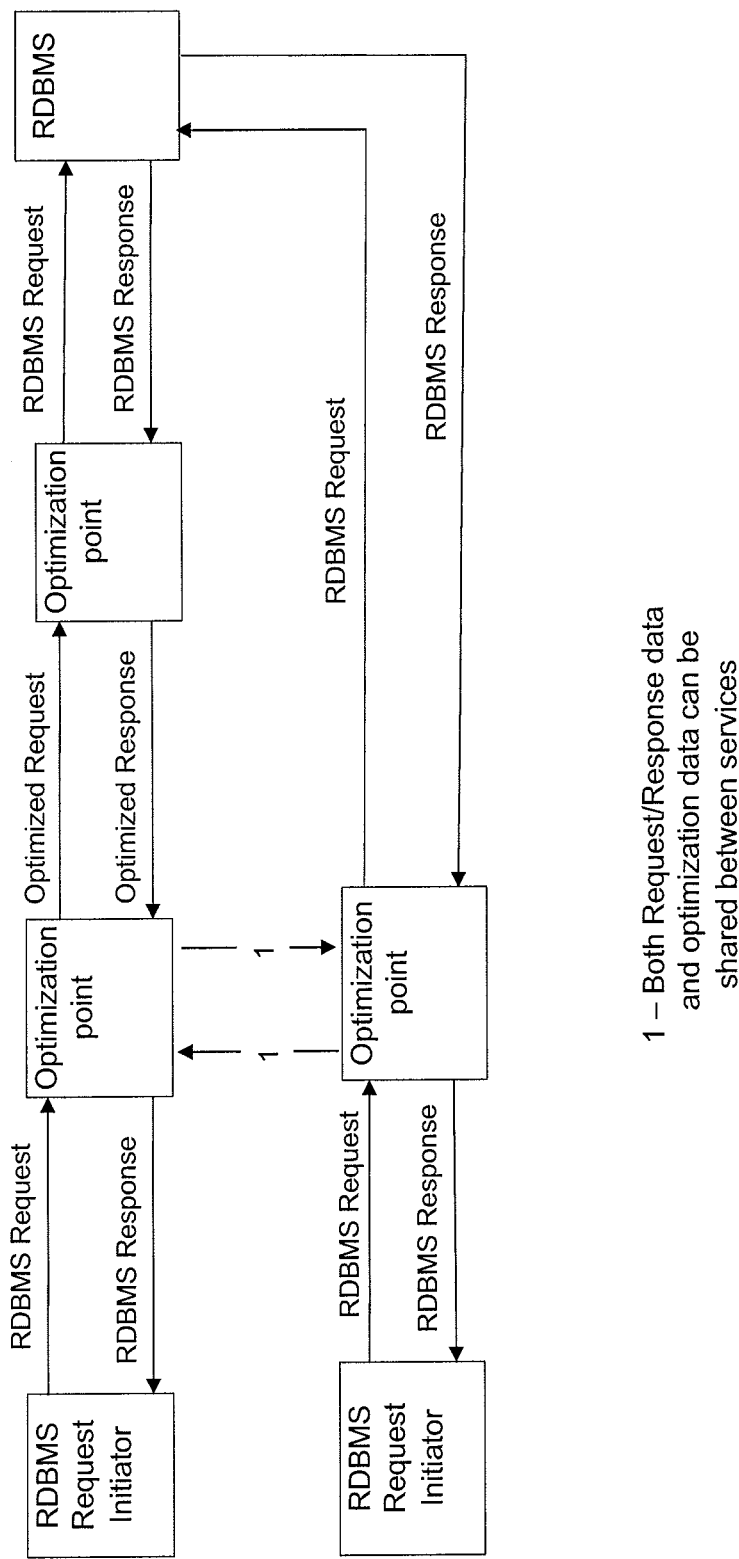
FIG. 5 shows how the data optimization services can interact with other services, initiators and DBMS (database management system) servers. RDBMS is Relational DBMS.

The diagrammatic example of FIG. 5 shows how the data optimization services can interact with other services, initiators and DBMS servers: the optimization servers are labelled in FIG. 5 as 'Optimization Points'.

There will be four main optimization techniques used on the SQL traffic and these will improve over time. These are:
  Peer-to-Peer Caching of queries
  Compressions and Encryption
  Predictive Pre-fetching
  String replacement How Will it Improve Over Time?

The initial software release will contain the framework and rules to accelerate database connection but it will have to be manually configured to a specific application. The subsequent versions of Data Accelerator will allow the acceleration (i.e. the applicable optimisation rules) to automatically adapt, improve and/or tune itself to any application. Subsequent releases will also use the network effect data (the aggregated data from all customers) that is generated from the users of the application to help us further improve the acceleration.

Section C: Application Virtualization and App Accelerator

What does it do?

Application Virtualization delivers applications to an-end-users computing device from a server with central control and management over the application and its license. Once the application is on the users' desktop, it is virtualized, meaning only the parts of it required to work while running the application are temporarily available and therefore there are restrictions to stop the application from conflicting with other applications on the desktop, thus preventing support issues. Also, this protects the software from piracy.

Why do we Need it?

Using Data Accelerator to centralise the database or move it into the cloud, removes the requirement for onsite database servers and onsite support for those servers. Combining this with Application Virtualisation also allows the client application to be managed and supported centrally rather than onsite.

Thus the combined benefit allows a total centrally managed solution thereby giving reduction in cost and increased productivity.

Application Virtualization

This technology gives good control mechanisms for the delivery of an application as well as a protection from conflicts and piracy of the Virtualisation capabilities. It can provide Digital Rights Management for preventing piracy and controlling billing and the use of the application, which in turn enables our customers to have innovative new revenue models and our customers to safely enter emerging markets with SaaS business models and their software protected from piracy.

How Will Application Virtualization be Integrated with Data Accelerator?

Application Virtualization is used for delivering the binary files for applications or data while Data Accelerator is used for the transfer of structured information between an application and its database. The integration of these products will allow any type of application to be delivered and for users to be able to access the back end data for the application.

Our solution uses the App Accelerator to download, maintain and provide custom services for application virtualization packages, custom services could include licensing and DRM control for example.

The Download and Run Architecture Using App Accelerator

The process for users running applications using App Accelerator is typically:
  1. User Browses to a web site or uses a predefined URL
  2. User logs in
  3. The user credentials are checked against our licensing server to ensure they have permissions to use the required application
  4. The User launches the virtualized package by, clicking a button labelled "Launch" which downloads the App Accelerator
  5. When the App Accelerator is downloaded, the user runs the exe which was downloaded
  6. App Accelerator starts, creates any desktop/miscellaneous shortcuts and ensures that the latest version of the files required for the application virtualization package are available, if not it will download them. Each individual virtualized application package has its own set of required actions, such as setting shortcuts and downloading supporting files which are carried out as required.
  7. The App Accelerator then downloads the correct version of the application virtualization package, including if required Data Accelerator and then starts the virtualized application.

When the user next tries to use their application virtualization package, the App Accelerator is started, which runs through the checks to ensure that both itself, and the application virtualization package, is up to date, if necessary it will download any updated files and then start the virtualized application package.

Using the process, the user needs to download the file and run it only once, from that point on the application virtualization package will always be up to date.

The benefit over traditional systems without any virtualization is that typically those legacy type applications would need to be installed, the process would be for the customer to download a setup program or insert a CD into the computer, then they would need to go through an installation process, which many users are unable or unwilling to do. Any updates to the application would need a new installation program or possibly an uninstall routine followed by an install routine.

The benefit over alternative application virtualization solutions without the App Accelerator is that the downloaded application either needs to have a virtualization manager/player installed, a browser plugin installed, or the application needs to be manually downloaded and updated when the user chooses to do so with no central control of management.

The Combined Effect of Using the App Accelerator and the Data Accelerator

One of the major shortfalls in the typical usage of application virtualization is that although application virtualization packages can be installed over the internet, many such packages require a database or other data source and this data source is often far too large, complex or critical to a company for it to be virtualized as well, or it is required to be shared centrally between users and cannot be virtualized individually on each machine. This is where the App Accelerator can be used to allow users to run programs easily by using our download and run application architecture, and then Data Accelerator can be used to allow the application virtualization package to work with a remote data source.

As application virtualization packages are often large, and when they are updated only a subset of the package actually changes. Data Accelerator can also be used to stream the files required to reduce the time for initially launching the application and reducing the time to download updates. This is achieved by using the App Accelerator to stream the application virtualization package through a connection optimised using Data Accelerator, for example the App Accelerator can be configured to:

1. Download the Data Accelerator
2. Start the Data Accelerator
    a. The Data Accelerator can then use predictive pre-caching on a WebDAV share over the internet to pre-cache the blocks of files that the App Accelerator will use to launch the application
3. The App Accelerator can then download the virtualized application package through the Data Accelerator taking advantage of the standard rules that the Data Accelerator provides, such as predictive pre-caching, caching, compression, multi-stream TCP parallelism, TCP packet merging etc. to download the package and then route the requests for the remote data source through the Data Acceleration which can then apply the same rules against the network traffic for the data source which is discussed elsewhere.

Additionally once the application virtualization package is accessed through the Data Accelerator, rather than being downloaded in full and saved locally, we are able to use Data Accelerator as effectively a gatekeeper to the application virtualization package. The two main uses for this are for highly flexible licensing controls and Digital Rights Management (DRM). As a virtualized application is never installed onto the local computer it can only be run when the computer is able to access the application virtualization package. Therefore with Data Accelerator acting as the gatekeeper to the centrally stored application virtualization package we are able to prevent the application from being run in any way unless it is routed though Data Accelerator. An additional layer of security would be that the central server that contains the application virtualization package would be configured to only respond to requests from an instance of Data Accelerator.

To provide highly flexible licensing (e.g. time based usage, limited number of times an application can be run, try and buy etc.) the Data Accelerator is configured to check if the user has permission to run the application from a central database before allowing access to the application virtualization package; also the Data Accelerator can be configured to keep a time based token of remaining usages and then cease to allow access to the package once the time has expired; thus stopping the application from running. Additionally as Data Accelerator is able to decode the network traffic it can prevent operations like a file copy from being able to be run so that the software cannot be pirated and the license checks cannot be bypassed; this provides the DRM capabilities.

In short, the App Accelerator and Data Accelerator combination provides a simple end user experience that facilitates client based computing using application virtualization which uses remote data sources as if they were local to provide a general usability that is not possible without either App Accelerator or Data Accelerator.

The Effect of Combining Application Virtualization with Optimized or Accelerated Interaction Between a Software Application and Database Server or Remote Data Source The breakthrough invention from the inventors that led to the creation of Data Accelerator and App Accelerator was that maintaining a traditional, client server architecture, but being able to centralize the server database or data source and the management of the client application would facilitate an improved and lower cost solution. This required the use of existing application virtualization techniques, but the missing link was combining this with an optimized or accelerated interaction between the client software application and the database server software or remote data source. The application virtualization techniques allow for the client application to be run on the client device without requiring traditional installation whilst the interaction optimization or acceleration allowed for the application to provide acceptable performance over low bandwidth or high latency connections. App Accelerator was then invented to further enhance the deployment and management of the application virtualization packages.

Section D: More Technical Detail

Data Accelerator is a system that intercepts requests that are being sent to a relational database, decomposing the request in order to understand the request and applying a set of rules in order to improve the performance of transferring the request and response. This can be applied to any Relational Database Management System (DBMS) database system. It enables, for example, legacy DBMS platforms to be migrated efficiently to cloud-based operation.

A set of rules can be applied to optimize the request and/or the response so that the initiator of the request gets the response results as quickly as possible. The present implementation of the invention is predicated on the fact that requests sent to a DBMS are often unnecessary duplicates, the requests often return a large amount of data that may or may not be actually used and the DBMS systems do not take into account external factors such as the performance of the network, the load on the DBMS and whether the client already has some or all the data it needs to fulfil the request. Instead of getting the DBMS system to run and generate a response to every request, an implementation of the invention can for example analyse the request and decide on a course of action that can either avoid having the DBMS re-run the query, thereby saving the time it takes to execute the query and the time it takes to transfer over the network, or it can alter the request and/or the response in order to serve the response more efficiently. We will refer to this as an optimization system, optimization server or optimization point. These optimization systems can be implemented in hardware, software, or a combination: for example, they may be implemented in a computer running appropriate software; the computer is located between the initiator and the DBMS.

Similarly, they may form part of the DBMS, for example being part of the software controlling the DBMS, or be part of the software running on the initiator's computer. Or they may be distributed across the DBMS, the initiators' computers, or one or more intermediary servers. In each case, the existing client application (running on the initiator's computers) and the server (the DBMS) are substantially unchanged by the optimisation system; this is very different from conventional and costly bespoke coding approaches to data flow optimisation.

Multiple implementations of the invention (each providing optimization services) may (optionally) be used at different network points between the initiator of the request and the DBMS. When routing is done between two or more of the systems that each provide optimization services, then these systems (i.e. optimization systems) can include additional information either in or around the request for upstream or downstream optimization services in order to learn more about the request and responses so that they can understand the effectiveness of any rule applied and also offer other guidance about results of the optimization and possible further optimizations.

When there are other versions of the optimization services running which are not in the direct path between the initiator and the DBMS, such as separate clients on a peer-to-peer network, then they may optionally also share both request and response data as well as information to learn about the effective methods of optimizations described above. Rules can be selectively enabled or disabled based on a number of factors such as initiator and DBMS addresses, the locations, time of day, configuration or other methods such as server load. An example of how the optimization services can interact with other services, initiators and DBMS servers is shown in FIG. 5: the optimization servers are labelled in FIG. 5 as 'Optimization Points'.

Major Components of the Preferred Implementation

Figure 29:
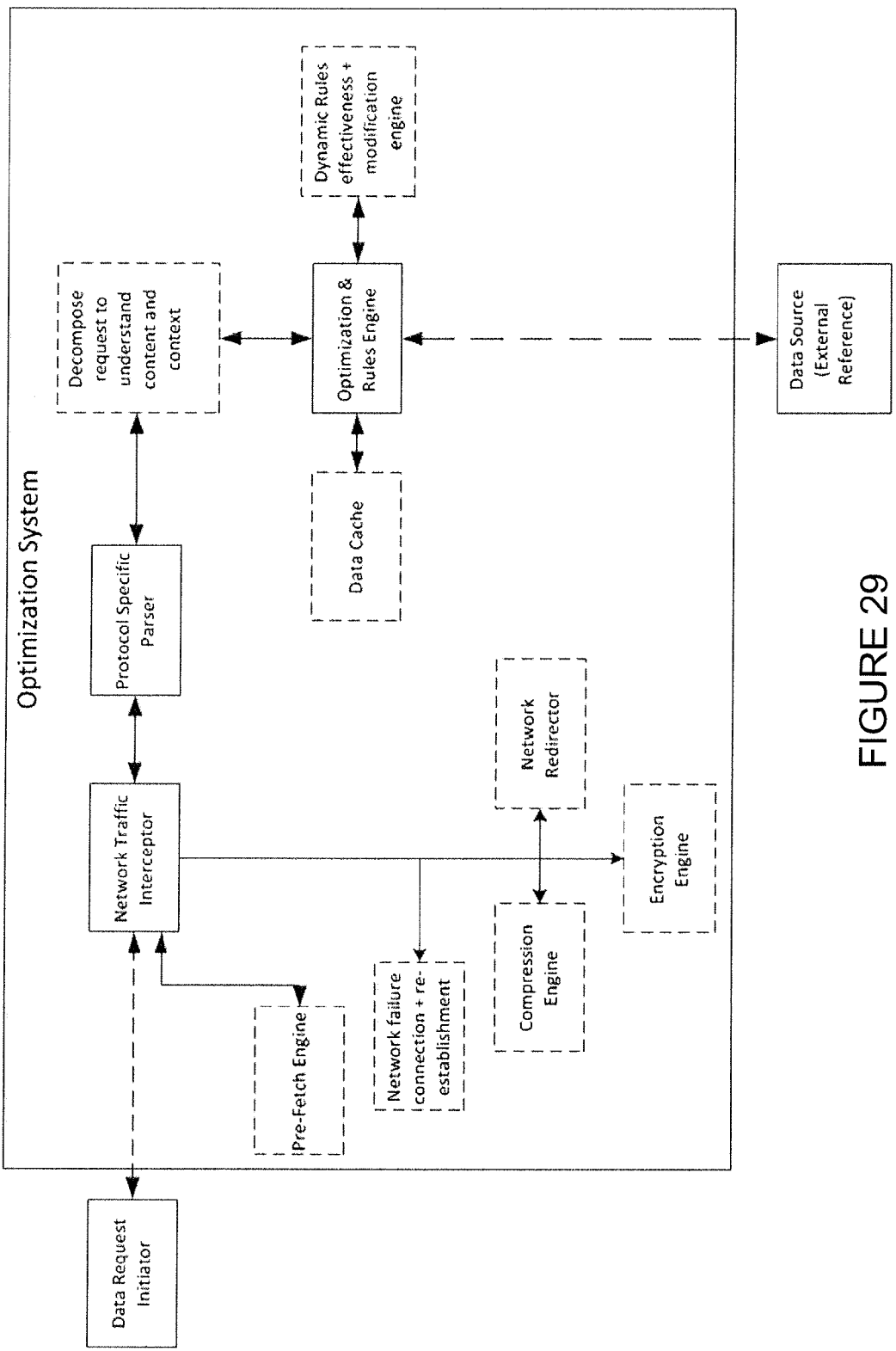
FIG. 29 shows the major components in Data Accelerator.

The optimization system is made up of a number of major components which are either required or optional. The FIG. 29 shows the required components with solid outlines and the optional ones with a dotted outline. They are described as follows:

Network Traffic Interceptor

The network traffic interceptor receives the request from the initiator; (i.e. client application) it is responsible for accepting the TCP/IP socket data that the initiator sends to the DBMS and passing the data to the protocol specific parser. The network traffic interceptor does not understand anything about the request as all it sees is a stream of data.

Protocol Specific Parser

The protocol specific parser takes the stream of binary data that the network traffic interceptor receives and splits or merges the binary stream into a message that is specific to the type of protocol being used. An example for Microsoft SQL Server which uses the TDS (Tabular data stream) protocol is that the size of the message is at byte offset 2 from the beginning of the stream, using this length the protocol specific parser can split the stream into messages. If the network traffic interceptor doesn't send enough data for a complete message the start of the message is buffered until the rest of the data is received.

The protocol specific parser also decodes the messages to show what properties each message has, for example with a SQL request, it will decode the message so the text of the SQL request can be read.

Request Decomposer

The request decomposer adds additional properties to the request which although they are not included in the request, are known because of the specific connection or previous queries to gain an understanding of the context of the query. For example in Microsoft SQL Server each connection has an identifier called a "SPID". The SPID can be included in the request but it does not have to be. By monitoring requests and responses the SPID can be saved and appended to every request that comes in. The SPID can then be used by other components to retrieve metadata about the request directly from SQL Server using the SPID.

Optimization & Rules Engine

The rules engine takes each request or response and applies all the rules that have been configured for each point the rule can interact with the request and response. For example, in one situation when the request has arrived but before it has been forwarded to the server, the Cache Server rule is applied to the request to see if the response can be served from cache.

Dynamic Rules Effectiveness+Modification Engine

This takes data from a number of sources about how well each rule is working or in some cases about how the computer environment is working and determines what it is that the rules should be doing in general and specific cases. For example in order that the compression rule should know whether or not to compress some data, the rule needs to know how long on average it takes to compress a piece of data x bytes long and how long it takes to send x bytes over a specified network link. The rule modification engine in this case will monitor how long it takes to compress each packet as they are compressed, it also monitors how long it takes to send different sized packets over the specified network link, the information is then requested by the compression rule to determine whether or not to compress the data it currently has. The effectiveness engine may also track how long different types of data take to compress, i.e. a series of 100 0's takes 1 ms but 10,000 random bytes takes 6 ms, this data can be used to determine whether it is faster to compress, send then decompress or to just to send the data.

We will now take a look at the optional components in the preferred implementation, they are optional as some users will not want or need all components but other users will make use of all of the components.

Pre-Fetch Engine

The pre fetch engine ensures that where possible queries are available in the data cache so that when queries are requested, the responses are available so the request does not have to go upstream to the server data source. The pre-fetch engine stores the original request so when it knows that a request may be used, it can pass the original binary data stream to the Network Traffic Interceptor, the reason for this is that the request is then handled as a normal request from the initiator and other rules such as the compression rule can also be applied and no custom logic needs to be added so that the pre-fetch engine can access the data cache etc.

Network Failure Connection+Re-Establishment Engine

This component monitors the network connections and if a failure occurs, attempts to create a new connection to allow the client to continue working on the connection.

The way the engine works is to monitor all reads/writes to a network socket. If any of these fail because the connection has been closed; the re-establishment engine connects a new socket and uses that for the read/writes. In the case of a read, the original request is re-sent, and the responses (if there is more than one) returned from the last time data was sent back to the client. There are some situations where the connection cannot be recovered, for example when the request is not cacheable and it needs to be re-run so the reads can be re-read, in this case the client application receives a connection termination and handles it as necessary.

Compression Engine

This is the component that handles compressing and uncompressing data when requested by the compression rule. The engine takes uncompressed data and uses a configurable compression method such as the Lempel-Ziv method. The data is then appended with a header showing that the data is compressed and the method used. The compression engine is then used by the up or downstream instance of Data Accelerator to decompress the data. Because the data that is compressed is typically very similar the compression engine may decide to apply some extra techniques such as using a pre-known compression table which can be stored in the Application Intelligence Table (AIT) so the table does not need to be transmitted with each set of compressed data to further reduce the size of the data.

Encryption Engine

This is the component that handles encrypting and de-encrypting the data when asked by the encryption rule. The data is encrypted in a more blanket approach than the compression as encryption is either required or not require for a given link. If the data is encrypted it has a header which shows that it is encrypted and the encryption method used as well as details on which certificates etc. should be used to decrypt the data.

Network Redirection Engine

This monitors servers for uptime and performance and when a server goes offline redirects all connections to a backup server.

There may be additional optional components depending on a user's need, they may for example need an engine to change the way data is transferred from TCP over IP to UDP over IP for example and this would require an additional engine to do the translation.

Application Intelligence Table (AIT)

The optimization engine has a global table which lists all queries that are received by an application (e.g. the client application or the server software), the table is available to all components and all components can feed into the Application Intelligence Table so that the optimization can make the best decisions for each request/response that is received.

The AIT contains details of the query that is being requested, whether the query is cacheable, which base tables are read from and written to and data about how previous requests have performed, the following is a representation of a subset of what a row in the AIT may contain:

Query: "Insert Into TableTwo Select * from TableOne"
IsCacheable: No
BaseReadTables: "TableOne"
BaseWriteTables: "TableTwo"
Previous Request Times:
Was Compressed True, Time: 00:00.22
Was Compressed True, Time: 00:00.26
Was Compressed False, Time: 00:00.94

Using the data, the compression rule, can for example in this instance see that the response time is much faster with compression than without, so will bear this in mind when deciding whether or not to compress the next time it sees this request.

The AIT can be extended by other components as necessary, for example the network redirection engine might have added some data to show that when one specific data source is used for a specific query it is significantly faster so it will ensure it always sends that specific query to the fast host.

The AIT is critical to managing the Data Cache in that when a query runs that includes a base write table, all of the queries in cache which have one of the write tables as a read table can be expired.

If a query, or a required part or property of a query, is not in the AIT then each rule will add different parts of the row until it is complete, for example the Cache Data rule, can see that the decision on whether a query is cacheable has not been made, so it connects to the DBMS instance, uses the execution plan to find if it is cacheable and determines which base read and write tables, if any there are, once the information is known it updates the AIT so other rules and future requests have the same information available.

This dynamic learning effectively means the AIT can grow and keep up to date as the application changes and/or users perform other operations that haven't been used before. The benefits of the self-learning AIT are that the developers of the application do not have to pre-program the AIT and as the AIT grows and understands more about the application, it can better optimize the application so that for users, it appears to get faster and faster.

The reason that the preferred implementation uses the AIT and pre-determines as much as possible is that it is more efficient than working out on the fly everything that each component needs to know about a query. It is a complex operation and without storing it for later use, there is a significant amount of duplication, depending on the requests that are being optimized.

DETAILED DESCRIPTION OF THE PREFERRED IMPLEMENTATION

Figure 7:
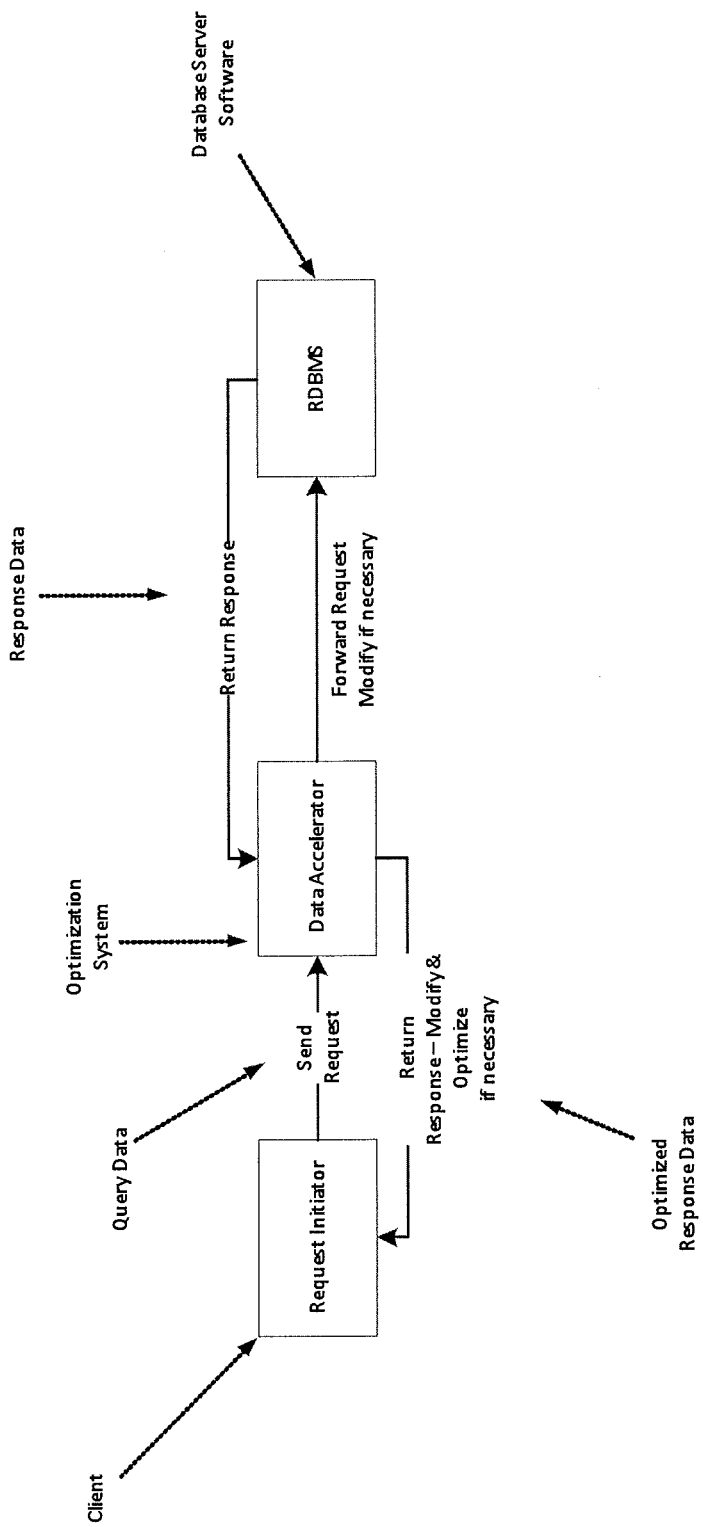
FIG. 7 is a schematic of the approach where the rules have not been able to stop the request from being sent to the DBMS so the request is forwarded.
Figure 8:
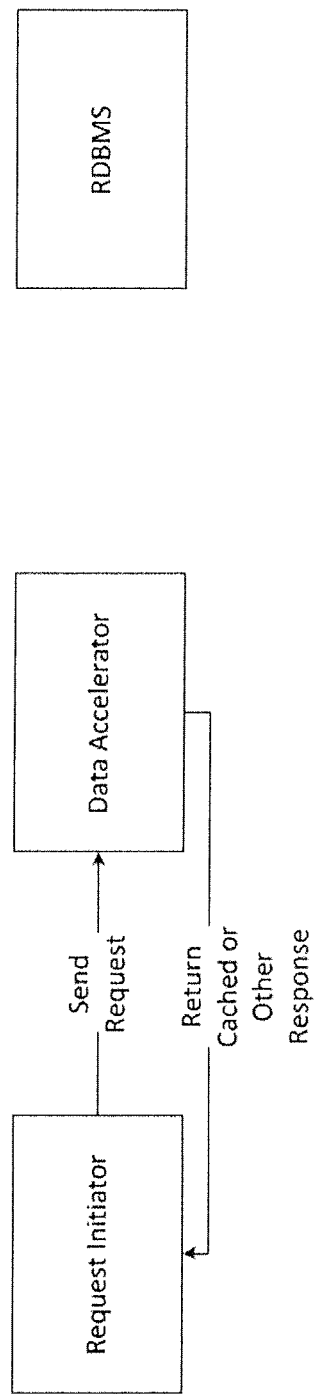
FIG. 8 shows the response is able to be served directly from the Data Accelerator optimization server and the DBMS system does not need to do anything.

Data Accelerator provides the interception, analysis and database traffic optimization described in the preceding sections. To re-cap on the fundamentals, the traditional approach for database systems (DBMS) is for the initiator of a request to send every request to a DBMS and for that system to run every single request. In one example, the present implementation of the invention challenges this orthodoxy by requiring that the requests and responses have rules applied to them to limit what is actually run on the DBMS, running queries more intelligently and making better use of network bandwidth to improve performance for users of DBMS systems by optimising the responses that are sent over the network. The example of the approach can be summarised as intelligently "intercept and analyse then respond, change or ignore" at the Data Accelerator optimization system. FIG. 7 is a schematic of the approach where the rules have not been able to stop the request from being sent to the DBMS so the request is forwarded. FIG. 8 shows the response can be served directly from the Data Accelerator optimization system and the DBMS system does not need to do anything. Typically the responsiveness of a DBMS system is affected by a number of factors such as, query compilation, load, data access (reading and writing to disks) and network response time. By using a rules-based framework that is able to intelligently learn how to apply the rules to give the maximum performance benefit, significant savings can be made whilst still having a scalable DBMS architecture.

The preferred implementation does not modify the query that is generated by the client (and that may then be received at the server software) or the response that is generated by the server software (and may be returned to the client), instead the request and response are modified during the transportation of the request and response, in that the data is compressed or cached but the client and server are unaware that the request or response is different. Hence, the optimisation system supplements the client application and the server software and acts on requests and responses that are formed and packaged by, respectively, the client application and the server software. When the response is not served from cache, the response is always generated in whole by the server; this then may be cached and served again later. Although the preferred implementation does not modify the request or response the optimization engine might in fact choose to do so.

Figure 9:
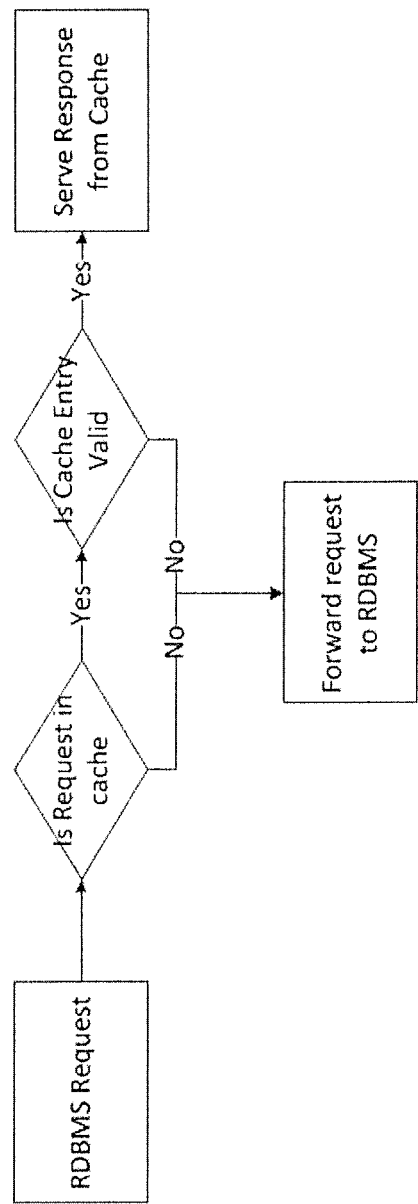
FIG. 9 shows caching of request and response data, to return the response direct from a cache without having to run the request on the DBMS.
Figure 10:
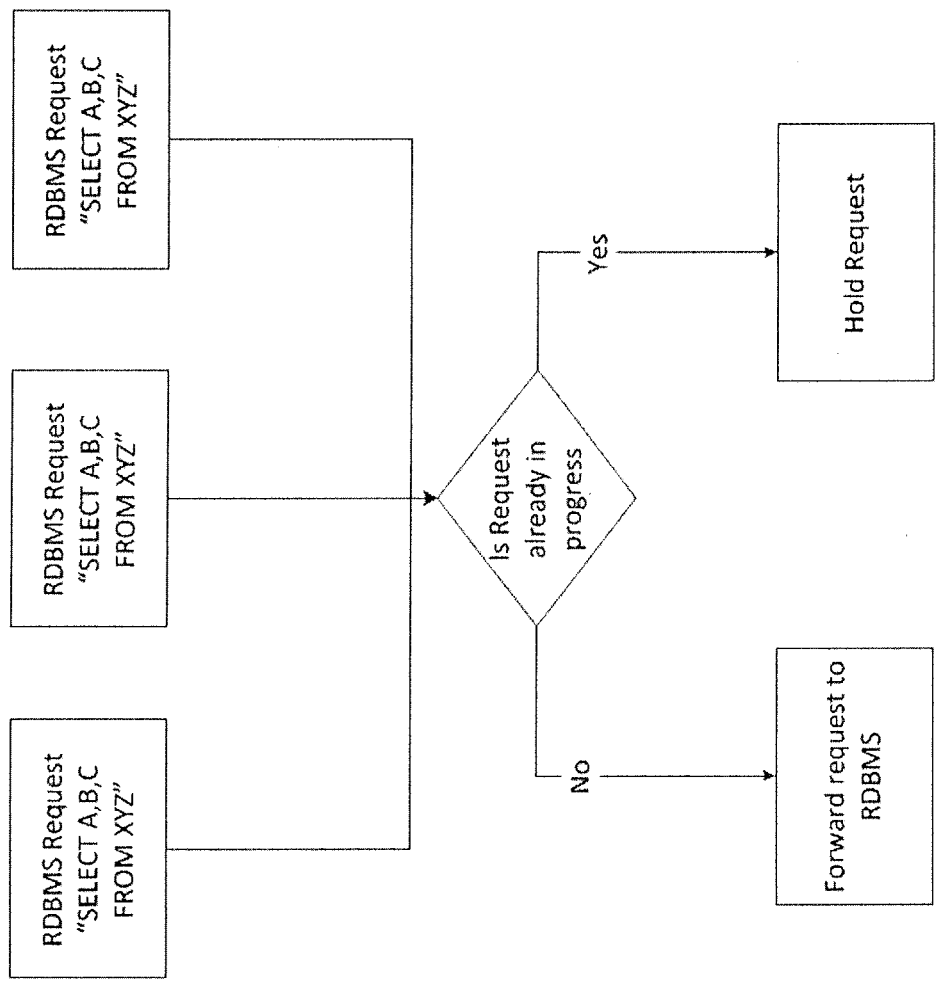
FIG. 10 shows Query Batching i.e. duplicate queries which have been requested at the same time can be stopped because the first request can be run while the duplicates are held, when the response to the first one is sent, it can be sent to all of the initiators; this Figure shows the requests being held.
Figure 11:
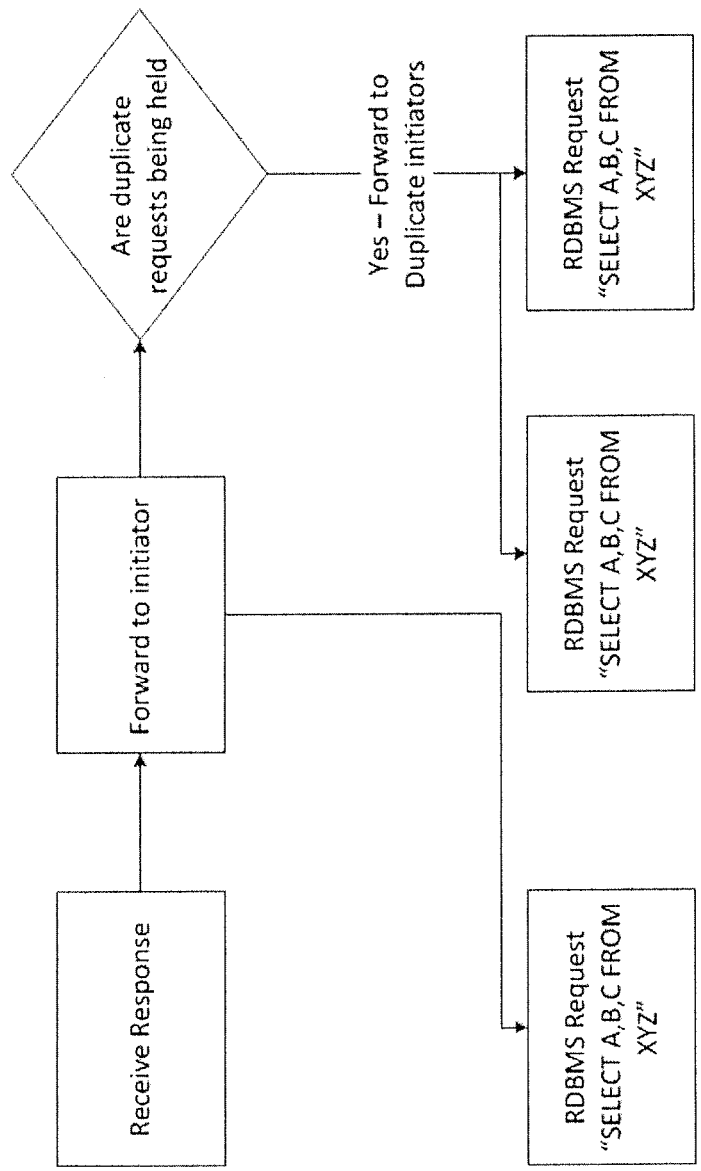
FIG. 11 shows Query Batching i.e. duplicate queries which have been requested at the same time can be stopped because the first request can be run while the duplicates are held, when the response to the first one is sent, it can be sent to all of the initiators; this Figure shows the response being served to multiple initiators.

The Data Accelerator can apply many different kinds of rules, such as any one or more of the rules in this non-exhaustive list:

- Caching of request and response data, to return the response direct from a cache without having to run the request on the DBMS—see FIG. 9.
- Pre-Caching of requests can take place so when a request has been seen before with other requests, those other requests can be sent to the DBMS so when the initiator requires them, they are available immediately.
- Query Batching i.e. duplicate queries which have been requested at the same time can be stopped because the first request can be run while the duplicates are held, when the response to the first one is sent, it can be sent to all of the initiators. See FIG. 10 which shows the requests being held and FIG. 11 which shows the response being served to multiple initiators.
- Compression of the request and/or the response which will decrease the time it takes to send the actual data over the network.
- Replacement of common strings to minimise the data travelling over the network.
- Re-Routing of requests to separate specific DBMS systems to provide a load-balancing feature
- Re-Routing of requests over separate specific network paths depending on which one is online and fastest.
- Request modification which will modify queries to only request the data that is required, for example adding a TOP X clause to a query that only requires a certain amount of data but requests more than it needs.
- Pre-Validating the request for errors such as incorrect syntax of the query language being used or for security issues, so these can be failed before even having to get the DBMS to fail the request.
- To address issues such as auditing and logging, a rule can be put in place to call the auditing or logging systems so that these can still be used.
- To address issues such as security over WAN links a rule can be put in place to encrypt the traffic between two Data Accelerator instances.
- There are sometimes simple requests for data which can be satisfied without the need to send the request to the DBMS, for example a query such as "SELECT 1" or "SELECT 10*100" always returns the same response, so where this is detected, the simple request response generator rule can generate the response locally.

These and other rules give numerous advantages over the existing method of having a DBMS run each and every request that is sent to it (and may be received by it), the specific advantages include:

- Lowering the actual cost and ownership cost of high performance DBMS systems, notably:
- The cost of having to have additional and more powerful hardware.
- The power costs associated with more physical servers and more powerful servers.
- The personnel cost of having to maintain the equipment and keep it running optimally
- Typically with DBMS systems, because of the amount of data that is transferred over the network, using a wide area link to connect to the DBMS is not possible, however using the Data Accelerator you can host your DBMS system anywhere in the world.
- As the Data Accelerator reduces the amount of requests being sent to the DBMS, the requests that it does have to deal with get more resources to complete in a more efficient manner, so even queries that cannot be helped by the rules framework will still complete faster.

Some examples should help to show how wasteful traditional systems are and how they can be optimized. The first example is of a national healthcare provider who without Data Accelerator would have to either host their DBMS in one location and use an expensive remote virtualization solution or have a DBMS in each branch office and replicate data around between branches which can be inefficient, prone to failure and expensive. Using the present implementation of the invention they can connect directly from each client via a local Data Accelerator instance, which applies any caching and pre-caching rules it can or compresses and encrypts all traffic connecting over the WAN to the Data Accelerator instance at the DBMS site where it is uncompressed and unencrypted and forwarded onto the DBMS. The response is similarly compressed and encrypted before sending back.

The benefit of this approach is that the healthcare provider simply needs one site that keeps costs low whilst still getting the performance they need. Typically when a patient goes to reception their details are first loaded so the receptionist's traffic can be prioritised by the Data Accelerator, as the data that is required is common i.e. there are a number of requests which get the patient records (e.g. names, address, date of birth etc.) the pre-caching can have a massive benefit. As the patient moves to the specific department, the information is already available at the local cache so it can be served immediately. This shows a situation where the Data Accelerator can be used where imperfect solutions were previously used.

The second example is of a global insurance company that has a number of reports showing the daily claims and policy sales data which are run by various levels of management every day. By using the Data Accelerator they are able to drastically reduce the amount of processing that the DBMS system needs to do during the online day so it can be used for other processing or a cheaper system can be put in place. The hierarchy of managers who view the reports are:

1× Global Director
5× Regional Directors
50× Country Managers—Each region has an average of 10 countries
2500× District Managers—Each Country has an average of 50 districts There is one report for each manager so the global director has a global report, regional directors have a report and each country manager has their own report etc. A report consists of one DBMS request. Typically each person views their own report, their peers reports (district managers peers are those in their country and not in all countries) and also their direct subordinates.

The data is refreshed once overnight and without the present implementation of the invention and request caching the amount of requests the DBMS needs to cope with is:

Global Director=6 Reports—1 Global Report and 5 Regional Reports
Regional Directors=275 Reports—Each regional director views the 5 regional reports and their own countries reports
County Managers=27500 Reports—Each country manager views all 50 country reports and their own districts
District Managers=25000 Reports—Each district manager views their own reports and all the districts in their own country
Total Requests=52781

If however we use caching, so that reports are only run once, then we simply count the number of reports that are available:
1 Global Report
5 Regional Reports
50 Country Reports
500 District Reports
Total Requests=556

That is 1.053% of the number of original requests. Because the same reports are run every day, once the data has been refreshed the Data Accelerator can employ pre-caching to generate the data the reports require before anyone has even requested the first report.

Deploying this for enterprise reporting solutions often means that it is possible to restrict the use of complicated and expensive pre-aggregating solutions such as online analytical processing (OLAP) cubes.

For a final example we can take a look at a website which shows dynamic pages directly from a DBMS system. The site is 24/7 and has pages modified by editors as well as data feeds constantly updating pages. By using the Data Accelerator they are able to improve the performance of the site and ensure that the resources needed to serve the site are reduced so the running costs are cheaper.

A page consists of, a site header, site footer, a site tree and the page itself where each item is a separate DBMS request.

On average:
1 Page every 5 minutes is added or deleted which changes the site tree
The header or footer are changed once every 7 days
The site receives 50 page views a minute
The situation without Data Accelerator is that the DBMS handles 2,000 requests/minute which are:
50× Site Tree
50× Site Header
50× Site Footer
50× Pages This equates to 12,000 requests per hour, 288,000 per day and 2,016,000 requests a week.

Using Data Accelerator, depending on which pages are shown, in the worst case scenario, where the page requested is always the page that has been modified there is still a massive reduction in requests:
1× Site Tree—every 5 minutes
1× Site Header—every 7 days
1× Site Footer—every 7 days
1× Page—every 5 minutes (if the changed page is not requested then this can be even lower)

This equates to 12 requests per hour, 288 requests per day and 2,018 DBMS requests every week. This is a reduction in the worst case scenario to 0.1% of the original requests.

Figure 12:
FIG. 12 shows a single Data Accelerator instance.
Figure 13:
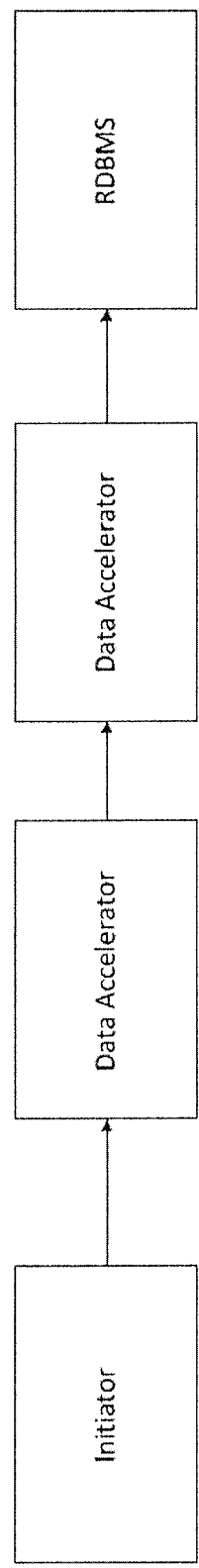
FIG. 13 shows two Data Accelerator Instances.
Figure 14:
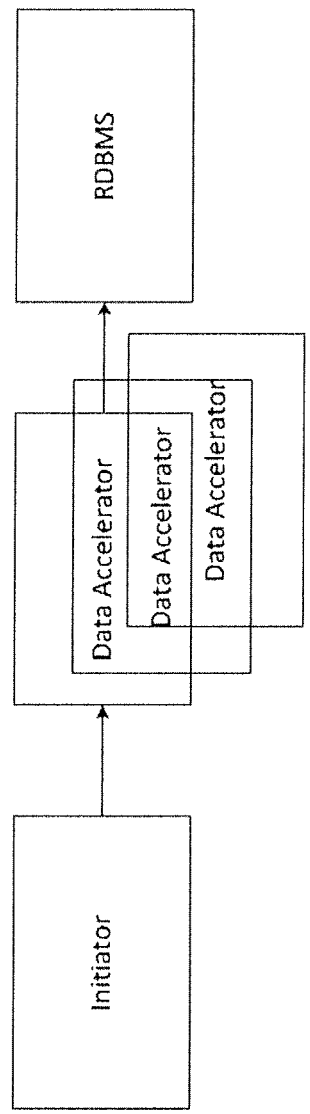
FIG. 14 shows multiple Data Accelerator instances.

The Data Accelerator optimisation system can work as either the only instance between an initiator and an DBMS or as part of a chain involving two or more instances; using multiple instances allows rules to do things to the request that they could not otherwise (compress, encrypt etc.) and share diagnostics and performance information between the instances. FIG. 12 shows a single Data Accelerator instance, FIG. 13 shows two Data Accelerator Instances and FIG. 14 shows multiple instances.

Figure 15:
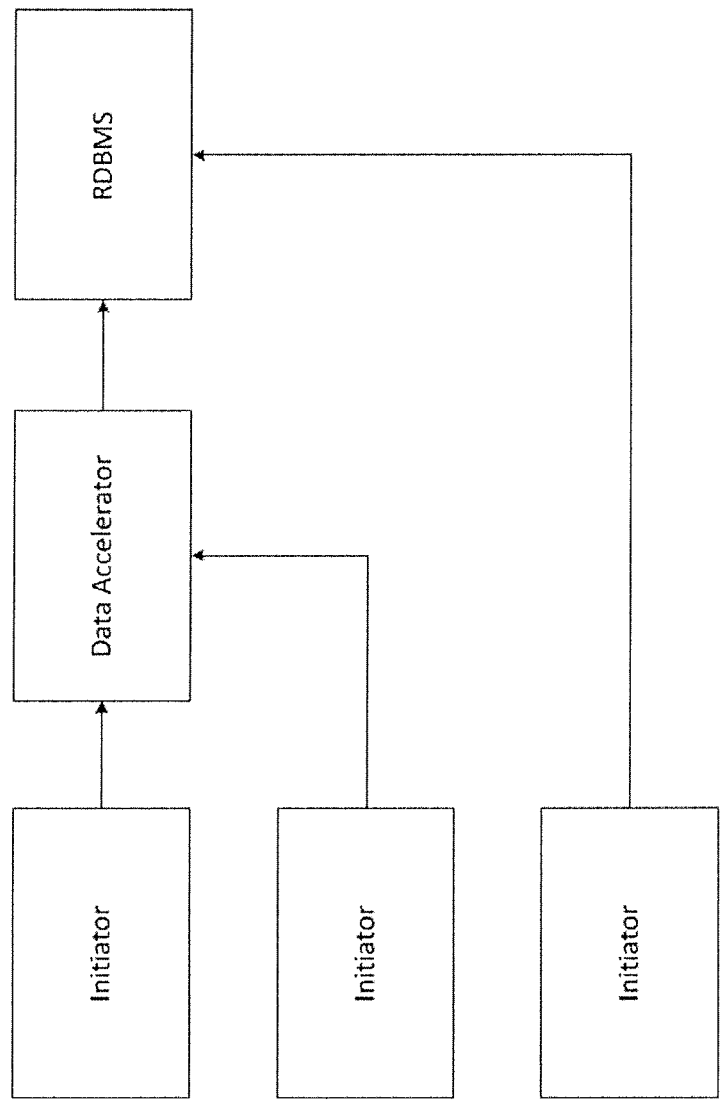
FIG. 15 shows that different initiators at either the same or separate locations can go through any route of Data Accelerator instances.
Figure 16:
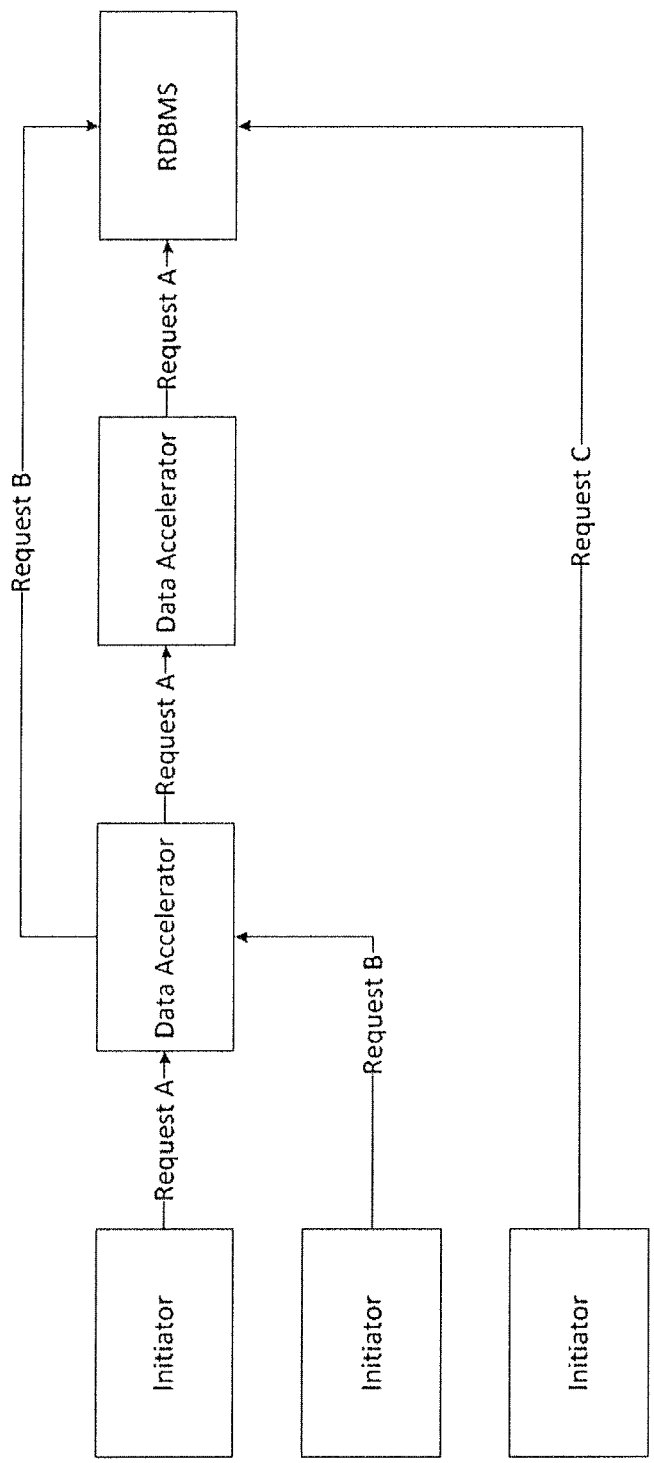
FIG. 16 shows how the Data Accelerator can change the route to the DBMS depending on where the request came from or a specific property of the request.

The path through a chain of Data Accelerator instances is not fixed but variable. Different initiators at either the same or separate locations can go through any route of Data Accelerator instances: see FIG. 15. FIG. 16 shows how the Data Accelerator can change the route to the DBMS depending on where the request came from or a specific property of the request. The Data Accelerators must be aware of other instances both up and down stream because some rules such as the compression rule will modify the request and it must be uncompressed before reaching the destination DBMS server otherwise the request would be invalid.

When the Data Accelerator sends a packet that has been modified, it wraps the contents of the packet in a specific message that the Data Accelerator will remove before forwarding to the DBMS or the initiator. In order that the Data Accelerator instances can know what rules they are allowed to apply to a packet, it uses a number of methods to understand where it is in the chain between the initiator and DBMS. One such method is for the first Data Accelerator instance in a chain to send a specially crafted DBMS request up the stream and to monitor for the response. Each instance has its own unique id. The first instance creates a request such as "SELECT uniqueID", the second adds its own id so it becomes "SELECT uniqueID, uniqueID" each instance in the chain adds its own id then when the response is received, the order of the instances unique id in the result set shows where it is in the stream.

Because Data Accelerator instances are aware of the chain and of other instances they are able to communicate between themselves within the network channel that has already been opened for the initiator. These messages allow the instances to share information about the requests and responses, such as how quickly they are being received at each point. With this information instances can dynamically determine how effective or detrimental a specific rule has been in a particular case so can choose to vary the applied rules (either not apply the rule or change the parameters to the rule or even test a different rule) to find the optimum performance enhancements. It is this dynamic learning that means Data Accelerator instances can consistently add benefit over time.

In order to analyse requests that are being sent to a DBMS, the Data Accelerator will extract the command that is being sent such as "SELECT A, B, C FROM XYZ" or the DBMS specific command in their own language such as Procedural Language/SQL (PL/SQL) for Oracle or Transact-SQL (T-SQL) for Microsoft SQL Server and use the command as the basis for applying the different rules that it has available.

Figure 17:
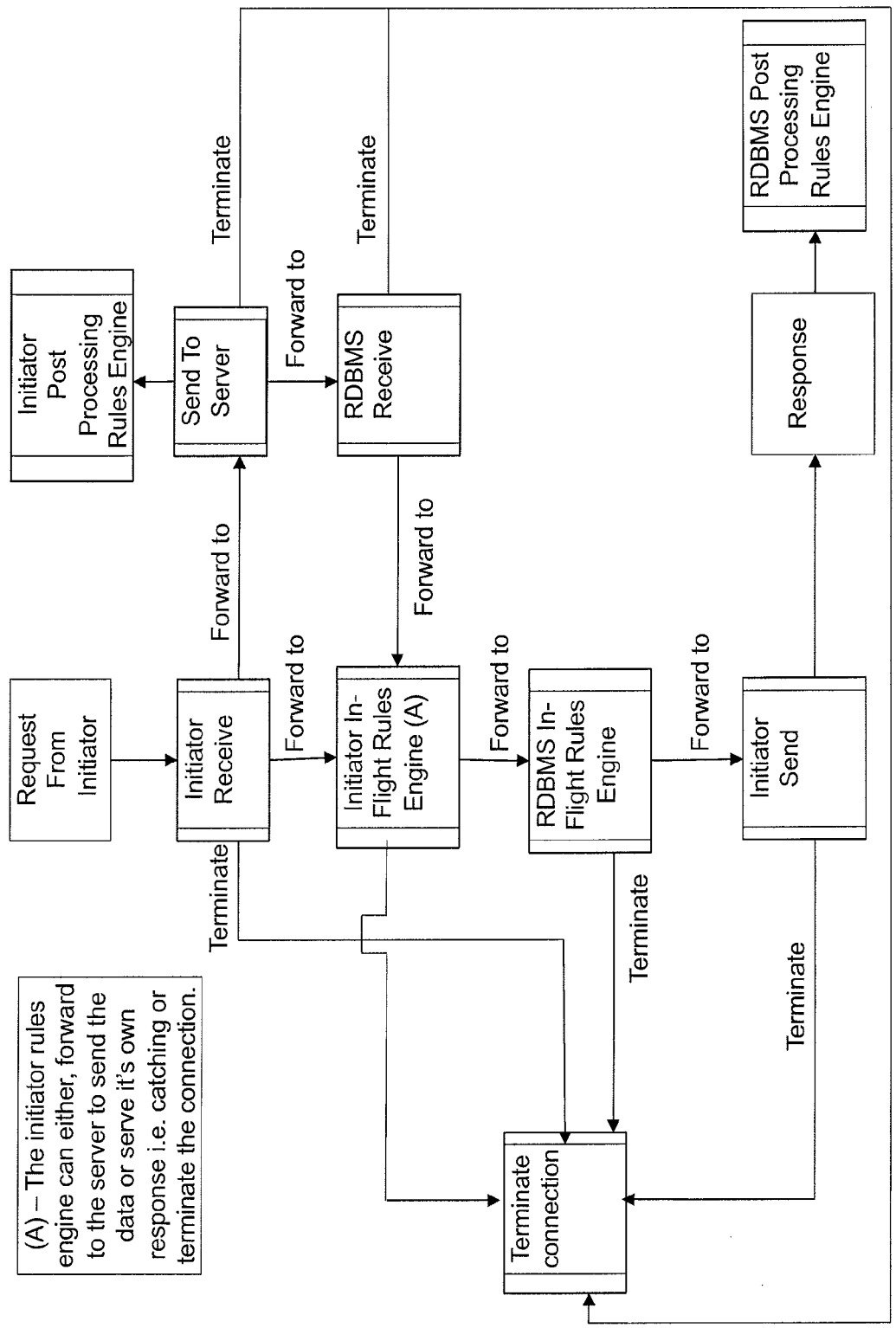
FIG. 17 shows the different points that the rules can be applied and the flow through the application. There are a number of different types of rules that can be applied at different points within the request/response stream.

There are a number of different types of rules that can be applied at different points within the request/response stream. Section E below expands on these rules. FIG. 17 shows the different points that the rules can be applied and the flow through the application. The rules are as follows:

Initiator In-Flight Rules
The request is received and rules such as the caching rule can decide to allow the request or serve a response directly from cache
Initiator Post-Send Rules
The request has been sent so rules such as the pre-caching rule can send other requests which may well be needed
DBMS In-Flight Rules
The response is received from the DBMS; rules such as the compression rule can be applied before it is sent to a downstream Data Accelerator instance.
DBMS Post—Send Rules
The response has been sent so the diagnostics rule can determine how good a job it did and how it could have been better.

We can follow a request with a specific example:
1. A request comes in and the protocol specific parser determines that the command is "SELECT a, b, c FROM xyz".
2. The initiator In-Flight rules are applied
a. The caching rule determines that it is in cache but has expired so cannot serve it b. The compression rule determines that there is an upstream Data Accelerator instance and the network link is slow so the data is compressed and wrapped in a Data Accelerator packet. These are example of the 'content and/or context' that we reference earlier.
3. The request is sent upstream.
4. The Initiator Post-Send rules are applied
a. The pre-caching rule determines that normally when this is sent (another example of the 'content and/or context' that we reference earlier), there are an additional 5 commands which are always run so it schedules the next 5 requests, the 5 requests are sent through the normal set of rules so caching and compression etc. can still be applied.
5. While the Initiator Post-Send rules are in progress, the response is received from the upstream servers. It is then passed through the DBMS server in-flight rules.
a. The compression rule determines that the data is compressed and there are no downstream Data Accelerator servers (another example of the 'content and/or context' that we reference earlier) so the data is uncompressed.
6. The response is then sent back to the initiator
7. The DBMS Post-Send rule is then applied
a. A diagnostics rule determines that the upstream link is a fast link and there is little or no latency so after running a test to compare how long it takes to compress data and how long to send over the network, the compression rule is turned off for upstream packets less than 1 k in size (another example of the 'content and/or context' that we reference earlier).
b. The pre-caching rule discovers that only 4 of the 5 commands it expected have been used and this has been the case for the last 5 times the specific request was sent so the caching rule has been modified to only request the 4 queries instead of the original 5 (another example of the 'content and/or context' that we reference earlier).

The key is that the Data Accelerator provides the rules but also diagnostics and in-built learning to change the rules dynamically to react to events as they happen in the light of the 'content and/or context' of the request and/or response.

Details of Specific Implementations

The Data Accelerator as an optimization system has been shown above to implement a protocol handler for a DBMS server, specifically Microsoft SQL Server but as noted earlier there are a number of different protocols that can be optimized in a similar manner. The optimization system and the rules are built in a protocol agnostic manner and so when looking at specific implementations it is enough to know:
How a request and response are defined
How to get the content of the request
How to get the non-environmental context information
Whether a request is cacheable
Determining when a cached item should be expired
The first set of protocols we will look at is ones that utilize Http, i.e. Http itself, WebDAV and Soap over Http.

A request is defined by a set of headers and an optional body sent in ASCII text, the headers finish with an empty line and the headers determine whether or not there is a body, i.e. whether there is the HTTP header Content-Length or other information such as a Content-Type or Chunked-Encoding.

In the content of the request is the contents of the Http Header and possibly the body, there are certain headers which can be ignored for the purposes of caching such as the Authorization or Referrer as these do not uniquely identify a request, rather some extra data that is unique to the client. For example to uniquely identify a request to determine a key for caching, a key is defined as some text which can be used to match requests, to requests/response pairs that are in the cache, if we take this HTTP request:
GET /Uri/Uri HTTP/1.0 [Carriage Return] [Line Feed]
Host: www.server.com [Carriage Return] [Line Feed]
Content-Length: 0[Carriage Return] [Line Feed]
[Carriage Return] [Line Feed]
The unique caching key would be:
"GET:/Uri/Uri:1.0"
This shows we have the request type, "GET", the requested resource "/Uri/Uri" and the version of the request, "HTTP 1.0"

We can expand this to support WebDAV and Soap by understanding the different types of WebDAV packets i.e. PropFind and Options and reading the Xml Body of the Soap Message which is used to define the caching key.

The context information is taken from headers such as the User-Agent which gives information about the client and client browser, the name of the server it was destined for etc. The inter-request relationships context is monitored by the Data Accelerator, watching requests and responses and noting which connection and client they came from and in which order.

To determine whether a request is cacheable, it needs to be broken into two broad categories and requires some additional information from the web server itself. The first is requests which are inherently cacheable such as requests for images, documents or files such as CSS files, these can be cached, until the point they are modified. The second set is requests which run application code such as Java Servlets or Pearl Scripts, it is not always possible to know what these are doing and when dealing with unknown scripts, it is possible for example for a resource to return totally different responses based on any number of factors including the time of day or the weather outside. In these cases it is necessary to use a number of methods such as monitoring the responses and compare to previous similar responses for the same request, analysing the resources by parsing the text and or decompiling any executable files and also using a manual method of having the owner of the resources define which resources are cacheable and which are not.

To determine when a request should be expired, there are a number of methods which can be utilized, such as the Http header If-Modified-Since can indicate whether a response has changed or the Data Accelerator can monitor individual files to see if they have changed, this is often effective where a web site is set to not allow caching but the files are the same and transferring the data over the internet again is a waste of time. A similar method can be used for Data Accelerator to request a resource from an upstream Data Accelerator instance, if the server responds saying it has expired, but the upstream instance determines that the content of the response is the same as a previously returned response then the upstream instance can tell the downstream instance to use the version it already has.

Another example of a protocol specific implementation is where WebDAV traffic is sent over the HTTP protocol, by understanding the WebDAV extensions, it is possible to further understand the content and the context of requests and provide a superior level of performance, even in some places add-in additional functionality to existing servers. This can be seen by having the Data Accelerator monitoring for Options requests, first of all these do not need to go to the data source as the Data Accelerator can pre-determine any specific options that the server does and does not support, in some cases where a server does not support a particular option, such as WebDAV version 2, the Data Accelerator can return that the server does and handle the protocol changes as required to make it look as if the server does support version 2.

Preferred Implementation of the App Accelerator "Download and Run" Architecture

When dealing with the scenario of a software publisher wishing to distribute applications to end users with an optional remote data source, it is preferred that the users do not need to install anything and can as simply as possible run their applications, making sure that they have the right license to access the software, it cannot be pirated, and that the software is always up to date, not least because unpatched critical security issues can cause serious harm to both users and software publishers.

Unfortunately because of the way internet browsers view security, it is not possible form a single click on a web site to download and run executable code which can start App Accelerator, you either need to install a browser plug in which typically requires user acceptance or you download an executable and the user then runs the application. The idea of the Download and Run Architecture is that users only have to do the very minimum to get their applications up and running and so they browse to the portal, click a button labelled, for example, "Launch", "Download" or "Run" to download the App Accelerator for the specific application, there is then some text to tell the user that they need to run the App Accelerator when it is downloaded, from this point on the App Accelerator is executing and takes over from the users and carries out a set of actions so that the user is able to run their application virtualization package with an optional remote data source.

An example of this is from the fictional Solicibert company that supplies law firms with time management and billing software. A lawyer logs onto the portal, their credentials are checked and a list of applications to which they have access shown to the customer, he then clicks on the "Launch" button for the "PerseusTimeTrack" application virtualization package, the launch button downloads the App Accelerator.

The user then runs the App Accelerator and it checks in the users profile folder whether or not the required files to run the package exist, if they do not then the files (including Data Accelerator) are downloaded, a desktop shortcut in the users roaming profile is created and the App Accelerator is copied to the roaming profile. The App Accelerator then validates the user has access to the software, starts the Data Accelerator and then starts the software and exits. The user then can use the software as if it was installed and as if the remote data source was local due to the optimization provided by Data Accelerator.

As the user changes the local configuration of the application, such as his user preferences, these changes are mirrored on his personal section of the web portal to a data source through Data Accelerator.

When the user tries to run the application package again, the App Accelerator verifies that it is up to date, and if the files need updating then it will update them, otherwise it starts the application.

When the user goes onto a new machine in the same company, his roaming profile has the shortcut to the application and the App Accelerator but no application files, so he starts the shortcut which downloads the package and the Data Accelerator and starts the application as before.

When the user goes home, he doesn't have the shortcuts on his home machine so he goes to the portal and re-launches the package, which gets the App Accelerator, the Data Accelerator, the package as well as any local configuration changes that were mirrored to the personal section of the portal.

For enhanced performance for larger application virtualization packages and to allow increased control to provide licensing controls and DRM; rather than download the entire application virtualization package (which can be several hundred MB) the package can be stored on a central data store and access using a remote network share, for example SMB, CIFS, WebDAV or FTP.

If the package were run from a remote network share without any optimization the performance of the application during use would be very slow as applications load large amounts of data from the data store that contains the application virtualization package into memory during runtime and unload the data once they are not needed to keep system RAM from being used up unnecessarily. This means that even with a package of 100 MB there could be over 1000 MB of data transferred during use as the same parts are loaded and unloaded from memory during use of the application. The result of this is slow performance of the application as client applications are written with the expectation that the source files are stored on a local disk with high-speed access compared to a remote network share. To overcome these problems the Data Accelerator is used to provide the relevant optimization techniques; for example caching of the blocks of the package so that once they are used the first time, they do not need to be pulled over the network again, or compression to reduce the amount of data that needs to be transferred, or pre-fetching so that once one feature of an application has used the blocks of data for the files needed to run a feature that always or normally follows are cached in advance. Using the Data Accelerator also means that when the application virtualization package is updated only the parts that have changed need to be downloaded as the other parts will already be cached. Also the application virtualization package can be enabled to run offline as the Data Accelerator can be configured to proactively cache all blocks of the package in the background for later use offline.

Once the application virtualization package is accessed through Data Accelerator, and especially as the server with the package source file is configured only to respond to network traffic generated by Data Accelerator, the Data Accelerator can act as a gatekeeper to the package for license control and DRM. The Data Accelerator can be configured to perform a check against a central database to determine if the user has access to that application and on what basis and it can then allow or deny access to the package depending on the response. A time-based session can be sorted in the memory of the Data Accelerator process which can be monitored so that when the time expires the access to the package is suspended. Additionally the Data Accelerator can be configured to deny network requests were it can be seen from the network packets that the users is attempting to copy the file; this provides DRM and anti-piracy. The cached blocks of the application can be stored as encrypted files on the local machine in order that the cache cannot be used unless it is accessed through the Data Accelerator; again providing an additional level of DRM.

Section E: the Optimisation Rules

We now look at how each of the individual rules work to provide the benefits already mentioned.

Simple Caching Rule

If we start with the simple caching rule, there are three parts, the actual caching of data called the "cache data rule", the serving of cached data called the "cache serve rule" and the diagnostics component "cache diagnostics and management".

In order that the Data Accelerator can cache data, the cache data rule runs after the response has been sent back to the initiator because, at this point the Data Accelerator has seen the request that was sent and the response that was returned, it has everything it needs to cache the data. There are a number of different types of cache that can be used, these include an in-process and out-of-process or separate machine cache and on permanent storage such as a hard disk. The cache is effectively a hash table lookup with the key being either the SQL command from the request or a hash of that SQL command. Depending on the type of cache, it will either store a pointer to the first response packet or it will store the actual packets as an array.

Before a response can be added to the cache, the rule must determine whether a request is actually cacheable. There are a number of factors which affect whether or not something is cacheable, there are certain types of SQL command which are inherently non-cacheable, for example an UPDATE or INSERT request, if this was cached and not forwarded onto the DBMS it could cause data corruption which is not acceptable. Other commands need to be looked at in the context that they are being used, for example an DBMS will have a command to retrieve the current date and time. If a request is sent to get all records in the future, depending on when the query was next run and if any records were added or deleted, it may or may not have a different set of results. If it is determined that the request can be cached, it is stored in the actual cache. If it cannot be cached, then we still store the request so further requests don't have to be verified.

Once a request/response are stored in a cache, the cache serve rule can be applied to requests as they arrive but before they are sent onto the DBMS, if the request is in the cache, it is verified to ensure that it is still valid, for example there have not been rows added to, deleted from or modified in the cached response. The users' permissions are then verified to ensure that they have the correct level of security to access the response and if they are allowed access then the response is returned.

The cache diagnostics and management rule's role is to verify how well the cache has worked for a specific request, to manage the cache size by expiring unused or not often used requests as well as expiring items which are no longer valid. To work out how effective a cached response was, it compares the total time it took the DBMS to return the response and compare it to how long it took to verify that it was still valid, check security and return the cached response—if the request is such that it is small and responds almost instantly then it may not be worth caching. If the diagnostics determine that caching the request is not adding a benefit, it will still monitor later requests to see if at any time it does become worth caching.

To see if a request is still valid the rule has a record of the items that the request used within the DBMS and monitors those for changes, if the changes affect the response then it can either decide to just evict the item from the cache or it can re-run the query so it has the latest response available in cache.

To manage the size of the cache, every time an item is served a counter is incremented and the time noted, if an item hasn't been used for a set amount of time or it is only rarely used then it can be evicted from the cache.

Intelligent Caching Rule

The next rule is the intelligent cache rule; this is similar to the simple cache rule in that it has three components and in fact can share a cache with the simple caching. In some situations the simple caching is not as effective as it could be. For example if the response to a request changes, the entire response is discarded. With the intelligent rule, it can assess how much of the response has changed and if it is under a certain percentage, which is determined by the diagnostics component, the cached response will be modified so that it is up to date. Where this is of most use is where a chain of Data Accelerator instances are being used perhaps, one close to the DBMS and others at remote offices, the intelligent caching rule can just request the portions of packets that have been changed from the upstream instance that is close to the DBMS so that the minimal amount of data is sent over the network to the local instance, which then merges the changes and then returns the cached response as required. The cache data rule works in exactly the same way as the basic caching rule, in that it determines the cacheability and stores it in a hash table.

The cache serve rule and the diagnostic rules however need a much more complex method to determine if the results can be merged or simply discarded. The rules will decide on whether to do a merge based on factors including the size of the response in that a small response may be quicker to get direct from the DBMS. It also takes into consideration how much of the data has changed. It does this by getting an upstream Data Accelerator instance to physically re-run the request. Once the upstream instance gets the response, it can analyse each packet in turn to see if it has changed at all and if it has what percentage of the packet is different. Once the rule knows how much of the data has changed, it can determine what to do and how complicated it is. Some changes are more complicated, for example, if the size of a packet has changed, either due to extra rows being returned, or a string changed then details like the packet size and protocol specific information need updating, but if something has changed but the length of the packet is the same i.e. swapping "Company A" for "Company B" then it is simply a matter of swapping the "A" for "B" which is an easier modification to make.

Intelligent Cache Eviction

There is a further aspect to caching that can be used to make sure that data is only evicted when it has actually been changed as opposed to when it has likely been changed. The intelligent cache eviction relies on the DBMS system splitting a data file into subsections, for example with Microsoft SQL Server each file is split into a series of 8K pages. For each request, instead of the actual tables that were used being monitored for changes, the pages that were read or written to when running the query are captured, and then if any changes happen, only the responses which were built using the changed pages are expired. In most DBMS systems it is possible that the subsections, i.e. pages, are moved or split or merged so there is a component in the intelligent cache eviction that monitors these and updates the internal references to the pages so the new pages are monitored.

This isn't effective in all scenario's just as in Microsoft SQL Server, when an "Index Scan" is run as part of a query, this means all of the pages that make up an index or table are read so all the queries that rely on those pages are expired. This is exactly the same as the simple method of cache eviction. The benefits of this are really seen when, for example Microsoft SQL Server does an "Index Seek" which uses a minimal amount of pages to return the response required.

Part Caching

A further aspect of caching is how certain queries are not cacheable because they update some data; sometimes there are queries which perform two operations. A good example is a query that reads from a secure table but also adds an entry to an audit log; the write operation is completely independent of the read operations, so instead of stopping the entire query from being cached, we can cache the read operations and send the update operations separately. This means that a query which typically is not cacheable is now cacheable.

For this type of update, where an audit table gets updated, it is important to guarantee the update so the AIT can be configured to ensure that data is only served from cache once the updates happen. This does slow down the request but it is still faster, in many cases, to have parts of the data cached than none of it.

Pre-Connection & Connection De-Coupling

Clients connecting to a DBMS typically find that creating a connection is an slow operation, this is even more noticeable when the database is located over a slow (e.g. under 5 Mb per second) network link, in order that a client can connect as fast as possible Data Accelerator pre-connects a number of connections to the server, then when the client tries to create a new connection a previously setup connection is used. The way this works is that Data Accelerator has two connections, an incoming connection and an outgoing connection; typically these are tied together but connection de-coupling means that these are no longer tied together and so an incoming connection can be spliced onto a separate outgoing connection. The benefits of this approach are that you can pre-create connections to speed up the process of establishing connections in the client applications as well as other benefits such as re-connecting dropped connections.

Compression Rule

If we now look at how the compression is implemented, compression relies on there being a chain of Data Accelerator instances between the initiator and DBMS, at the very least there needs to be two instances, one to compress and one to decompress the packets. Either the request or the response can be compressed but typically requests are small enough that compression is usually ignored. The compression piece is made up of three rules, the "compress rule", "decompress rule" and the "compression diagnostics".

The diagnostics component analyses network bandwidth within the chain of Data Accelerator instances to discover what speed each of the up and down stream networks are running so a score based on the performance can be used. Over time the performance will be verified to ensure if anything changes, or if there is a particularly busy period on a portion of the network, it is taken into consideration. The diagnostics component also checks to see how long it takes to compress/decompress packets and compares that to the time it takes to send over the network to find the best ratio of packet size/compression size over CPU cost to decide what to compress and what to ignore.

The compression rule will use both the network performance and the CPU compression cost ratios to determine whether a specific request or response should be compressed. If it is to be compressed it takes the packet(s), compresses and wraps the compressed data in a Data Accelerator compression envelope which can then be forwarded. The wrapper which contains the data is then sent either up or down stream depending on whether or not it was a request or response which was compressed.

The decompression rule examines each request and response to determine if they are compressed or not. If they are compressed, the rule will determine whether the link contains a Data Accelerator instance. If there is no instance that exists then the data is always uncompressed. If an instance does exist then the data is still uncompressed but only so that rules like the caching rule can be applied at each level; in this case the uncompressed data is not forwarded.

Pre-Caching Rule

Figure 18:
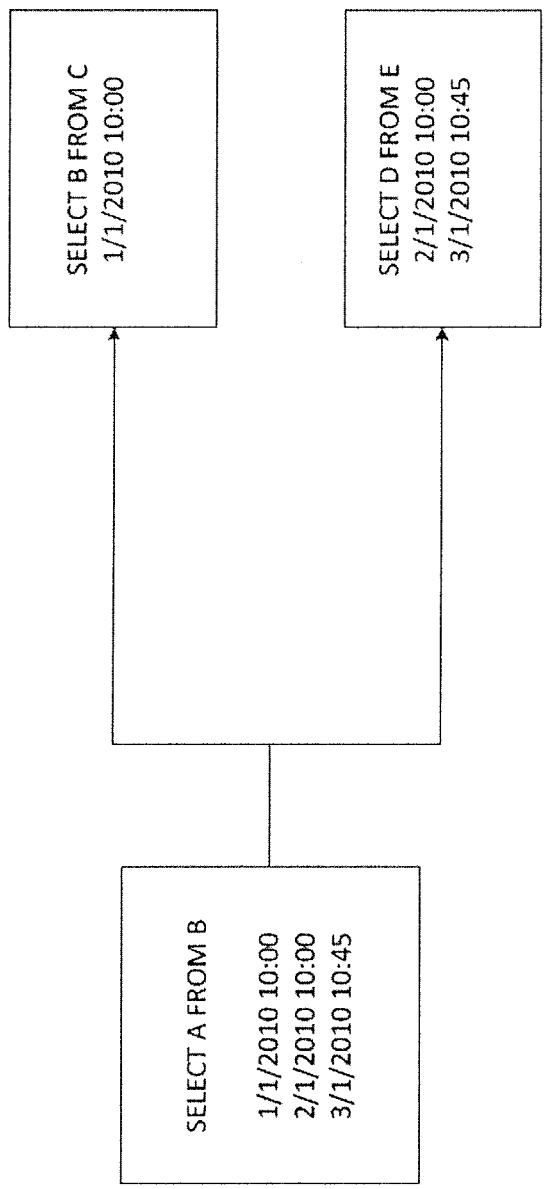
FIG. 18 shows that the first query was run three times, the first time it ran, the next request included the query "SELECT B FROM C", but all subsequent requests were for "SELECT D FROM E", so the pre-caching rule on the Feb. 1, 2010 (format: day/month/year) would have added a request for "SELECT B FROM C" which would not have been used, so this would then not be selected for pre-caching again but on the Mar. 1, 2010 the same query was run again so would have been selected for pre-caching and would have had the results ready when it was requested.

The next rule is the pre-caching rule. This is made up of one component, which intercepts requests after they have been forwarded upstream or to the DBMS. The rule is based around a map of requests that have previously been run through the instance. Each request that has been run links to the next request that was sent, if that same series of links had been made before then the pre-caching rule can run the next set of queries. If you look at FIG. 18 we see that the first query was run three times. The first time it ran, the next request included the query "SELECT B FROM C", but all subsequent requests were for "SELECT D FROM E", so the pre-caching rule on the Feb. 1, 2010 (format: day/month/year) would have added a request for "SELECT B FROM C" which would not have been used, so this would then not be selected for pre-caching again but on the Mar. 1, 2010 the same query was run again so would have been selected for pre-caching and would have had the results ready when it was requested.

The criteria the pre-caching uses for selecting or removing requests from pre-caching is based on how many times a sequence of queries has been run as well as how expensive it is to run a request. If a series of requests complete very quickly then it may well be worth pre-caching those even if they are not always used. Conversely if a request takes a long time to complete then it might not be worth running it just in case it is used.

Pre-Caching can also look for patterns in requests. For example if a request came in with the SQL command "SELECT * FROM Country WHERE CountryName='England'" and then the next request was for "SELECT * FROM Employees WHERE CountryID=1024" it is likely that the CountryID was returned from the first query. The pre-caching rule can then get a list of all CountryName and CountryID fields by querying the Country table directly, so when a request such as "SELECT * FROM Country WHERE CountryName='Wales'" the id could be inserted into the next query "SELECT * FROM Employees WHERE CountryID=??".

Query Batching

The next rule is the query batching rule which will stop duplicate queries running at the same time. This rule runs after the request has been received and before it has been sent to the upstream instance or DBMS. The rule has a list of currently executing requests and if the current request is already being run then it is held. The rule waits on the response from the request that is already executing and puts the new request on hold, adding it to a list of waiting requests. When the response returns, the rule copies the response to each waiting request.

The query batching rule needs to employ the same definition of cacheability that the caching rules use to decide whether or not something is cacheable because some things like INSERT or UPDATE queries need to be run on the server whether or not they are duplicates.

String Replacement Rule

The string replacement rule works by replacing common strings with specific id's which allows the rule to minimise the amount of data that is sent over the network. For example if a company name appears in a number of queries then depending on the length of the company name it can save quite a lot of network traffic by replacing "Company Name Corporation" with ":1:" or some similar identifier. This can work with either the request or the response and relies on there being more than one Data Accelerator instance in the chain: one to replace the strings and one to restore them.

If a packet contains string replacements then it is wrapped in a replacement envelope. When an instance receives a packet for forwarding, if there is an appropriate up or downstream Data Accelerator instance, it will replace the strings so it can apply any other rules on the instance but forward the original message. If however the upstream is the DBMS or the downstream is the initiator then the strings are put back into the message and forwarded on.

DBMS Load Balancing Re-Routing

Figure 19:
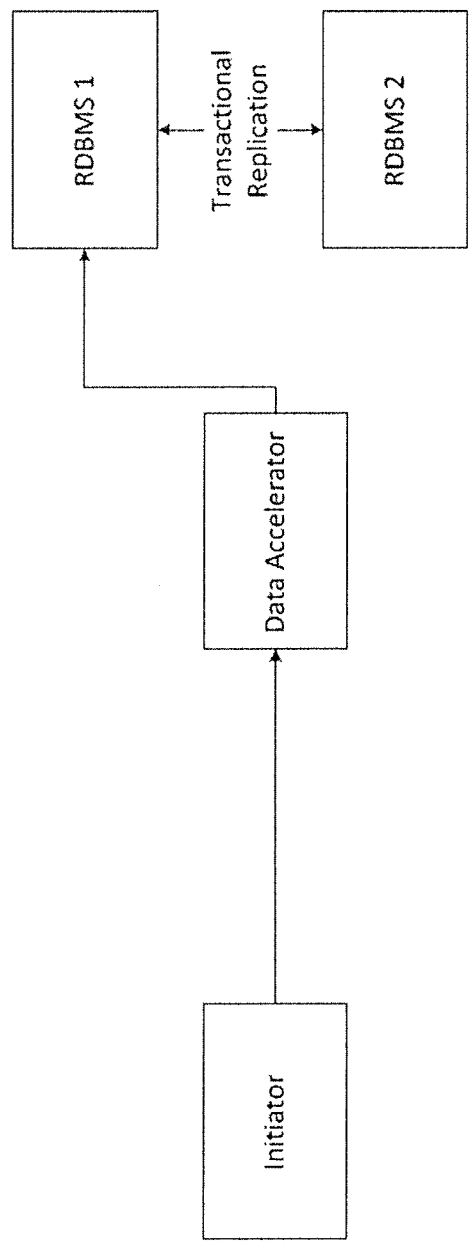
FIG. 19 shows two DBMS systems that replicate data between themselves and the Data Accelerator sending requests to the DBMS 1 system.
Figure 20:
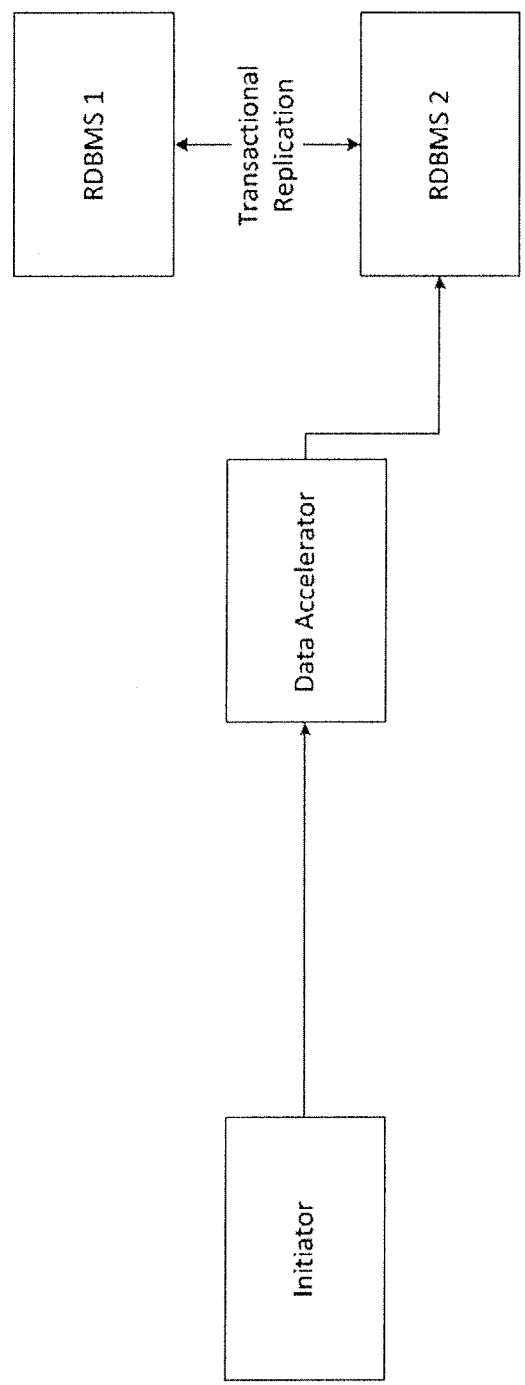
FIG. 20 shows that if the load-balancing rule determines that system 1 is under too much load and it is affecting query performance, it can switch to send requests to DBMS 2.

The re-routing rule monitors the load of a DBMS and chooses to run the query on the least used DBMS system. The re-routing rule requires some configuration and some specific requirements of the DBMS. The rule must have the details of the DBMS systems that can handle specific requests and the databases themselves must be able to handle requests no matter where the request ends up. Examples of these are read only databases or where transactions are copied to each database. FIG. 19 shows two DBMS systems that replicate data between themselves and the Data Accelerator sending requests to the DBMS 1 system. If the load balancing rule determines that system 1 is under too much load and it is affecting query performance, it can switch to send requests to DBMS 2 as shown in FIG. 20.

Re-Routing of Requests Over Separate Network Paths

This rule needs to be configured with multiple upstream Data Accelerator instances which can be connected via separate network routes. It has two components, the diagnostics rule and the redirector rule. The diagnostics rule constantly checks the performance of both up and downstream routes to score each one based on performance. The redirector works by intercepting requests before they are sent upstream and sends them via the fastest route at that time. It works with responses by intercepting them before they are sent back downstream in the same way.

Request Modification

This rule works by taking the request that was sent and modifying it to send a request that only asks for the minimum amount of data that is actually required. This rule does require that it is configured with a list of SQL commands it can modify. When a request arrives, it is checked against a list of SQL commands which can be modified, if it can be changed it swaps the portion of the SQL command that can be changed with the replacement query and then the response is rebuilt and then forwarded on. This rule does not apply to responses.

An example of a query that can be modified is a search screen that only shows a small number of records at a particular time and for each page re-runs the query which selects all records in the system. The query "SELECT * FROM B" could be modified to "SELECT TOP 10* FROM B", the benefit of this rule depends on the actual queries and how the initiators are using the results.

Pre-Validation Rule

The pre-validation rule takes the request, retrieves the SQL command and runs it through a series of checks to ensure that the request can actually be completed. If it finds that it cannot be completed then it returns the DBMS specific error message/code. The rule runs after the request has been received and before it is forwarded onto the upstream DBMS.

The checks it can carry out include a syntax check on the command to validate that the DBMS will actually accept the request. It can check that the request includes an actual command and is not just a comment, i.e. in a typical DBMS system "/*SELECT * FROM A*/" will not return a result as the command is commented out. It can also verify that the user has the permissions to run the query which will always result in a failure. The main benefit of this rule is that commands which are not valid do not need to travel over the network or to the DBMS for it to fail it outright.

Simple Response Generator Rule

This is similar to the pre-validation rule in that it attempts to return responses without the need of the request going to the DBMS. There are certain requests such as "SELECT 10" or "SELECT GetDateQ" which return a known result, in these cases the simple response generator rule, returns the response without the DBMS having to generate it.

Encryption Rule

The encryption rule requires that there be at least two Data Accelerator instances in the chain and typically the rule encrypts the traffic, both the request and the response when sending the data over an unsecured network like the internet. There are two parts to the encryption, the encrypt rule and the decrypt rule. When the request is received but before it is sent upstream towards the DBMS, the last thing that happens is that the data is encrypted if the link requires it. The encrypted data is wrapped in an encryption envelope and as the encryption is the last rule to run, the data may or may not be compressed or otherwise changed by an earlier rule. As each instance receives the request, if it is encrypted it decrypts it so the other rules can be applied. When it forwards the message, depending on whether or not the link is secure it either re-encrypts and sends the encryption envelope or simply forwards the unencrypted data. The type and level of encryption that can be used on a link are configurable and can be different depending on which link is used, for example on one link the rule could use Secure Hash Algorithm SHA-2 over Transport Layer Security TLS 2.0 but on another link use MD-5 (Message-Digest algorithm 5) over Secure Sockets Layer SSL 1.

Network Protocol Optimization Rule

The network protocol rule applies enhancements at the network layer as opposed to the application layer, so for example it might parallelise a large TCP buffer or it might change the underlying protocol. The rule will typically monitor how effective it is against different buffer sizes as well as continually monitoring the network links and parameters of those links to make the best choices.

Custom Rules

To ensure that things like auditing or logging occur in a DBMS system a custom rule can be put in place to run a specific command on the system as events occur in the Data Accelerator. In a typical system, there would be some auditing when a user carried out a specific action, for example if someone retrieved all the annual wages of all employees, it would need to be audited but if the caching rule had been applied then the request would not have arrived at the DBMS to be logged. The custom rules item is configured with a list of queries or events such as DBMS load balancing or network path re-routing and then a list of actions such as writing to a log file or sending a separate request to the DBMS.

Peer to Peer

If we now take a look at how the Data Accelerator instances in a chain or on a network can help each other by sharing diagnostics information and data between themselves and how that then can increase their effectiveness.

For individual rules to be most effective they typically use a diagnostic component to find optimum method of working to get the fastest response for the initiator, often where one instance has calculated something it is useful to the other instances that are available. There are two methods for communicating between Data Accelerator instances, the first is when the instance is not sure if the upstream point is another instance or the actual DBMS and it sends an DBMS request with the information that the Data Accelerator needs but that will not actually do anything if it does reach the DBMS. We can demonstrate this when an instance wants to enumerate the chain of instances and find the speed of each network link, it can send a request such as:

"SELECT '1 January 2010 09:43:22.02' As DAInstance4AA5888240B4448e9E20-62A8F70CF595, current_date As ServerTime"

The DAInstance4AA5888240B4448e9E20-62A8F70CF595 is the unique id of the Data Accelerator Instance, when the response comes back, it will include the time the request was started and the time on the server, and this gives an indication of how long it took to get a response from the network. When there is a chain of Data Accelerator instances, each instance adds its own uniqueID and time so the request actually ends up as "SELECT '1 January 2010 09:43:22.02' As DAInstance4AA5888240B4448e9E20-62A8F70CF595, '1 January 2010 09:43:22.04' As DAInstance936C4368DE18405881707A22FDBCFE59, '1 January 2010 09:43:23.09' As DAInstance8F4AEA5AE4D544cd9B56DF16F7563913, current_date As ServerTime"

The response from this will be a data set such as is shown in FIG. 6.

Each instance can then instantly see where it is in the chain and also that the speed of the link between the 2nd and 3rd instances is a slow link so they can make better decisions based on this knowledge.

Also if the first instance receives a request such as this, it then knows there is a downstream Data Accelerator instance and instead of re-running the query, after combining the request it received with the results it already has it can simply share the updated results with both the initiator and the upstream servers.

Figure 21:
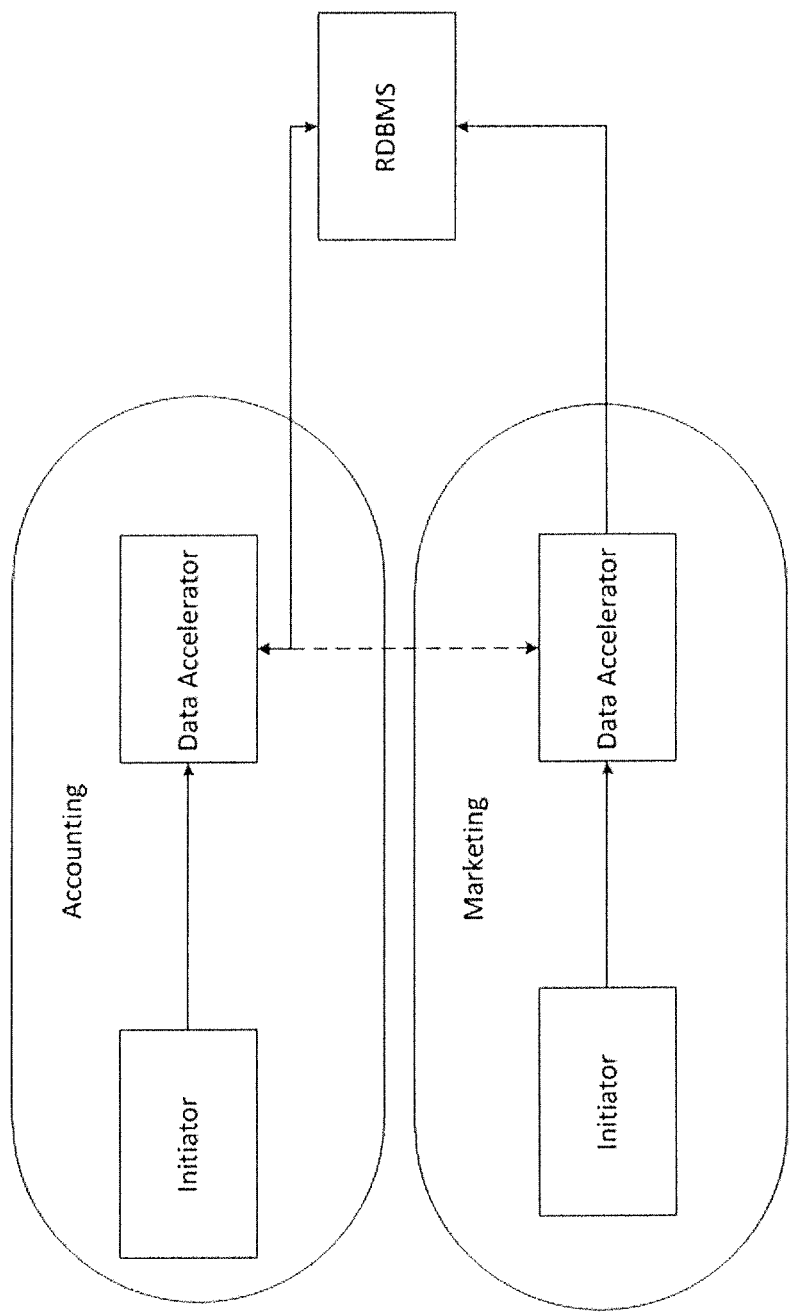
FIG. 21 shows how there are two separate workgroups, Accounting and Marketing; they both use the same DBMS but rarely run the same queries.

The second method of communication is where an instance knows that another instance exists and wants to either find out what it knows or wants to pass on some information, it creates a connection using the DBMS network method but instead of the network packet that the DBMS expects, it sends a Data Accelerator control packet. The control packet instructs the instance, not to forward packets up or down stream but to pass the packet onto the specified rule. The rules are given the information in the control packet and it acts on that as required. If we take a look at this in detail with an example of the caching rule, FIG. 21 shows how there are two separate workgroups, Accounting and Marketing, they both use the same DBMS but rarely run the same queries. Each department has their own Data Accelerator instance which connects directly to the DBMS. Because there is no chain the instances cannot communicate by sending requests up the chain. Instead they create a connection using the standard DBMS method and use this to send control packets. In the case of caching, where a request comes in from the Marketing which has already been served to Accounting, the caching rule, as well as checking its own cache can ask the Accounting instance if it has the query cached, if it does it can serve it without having to send the request to the DBMS.

Figure 22:
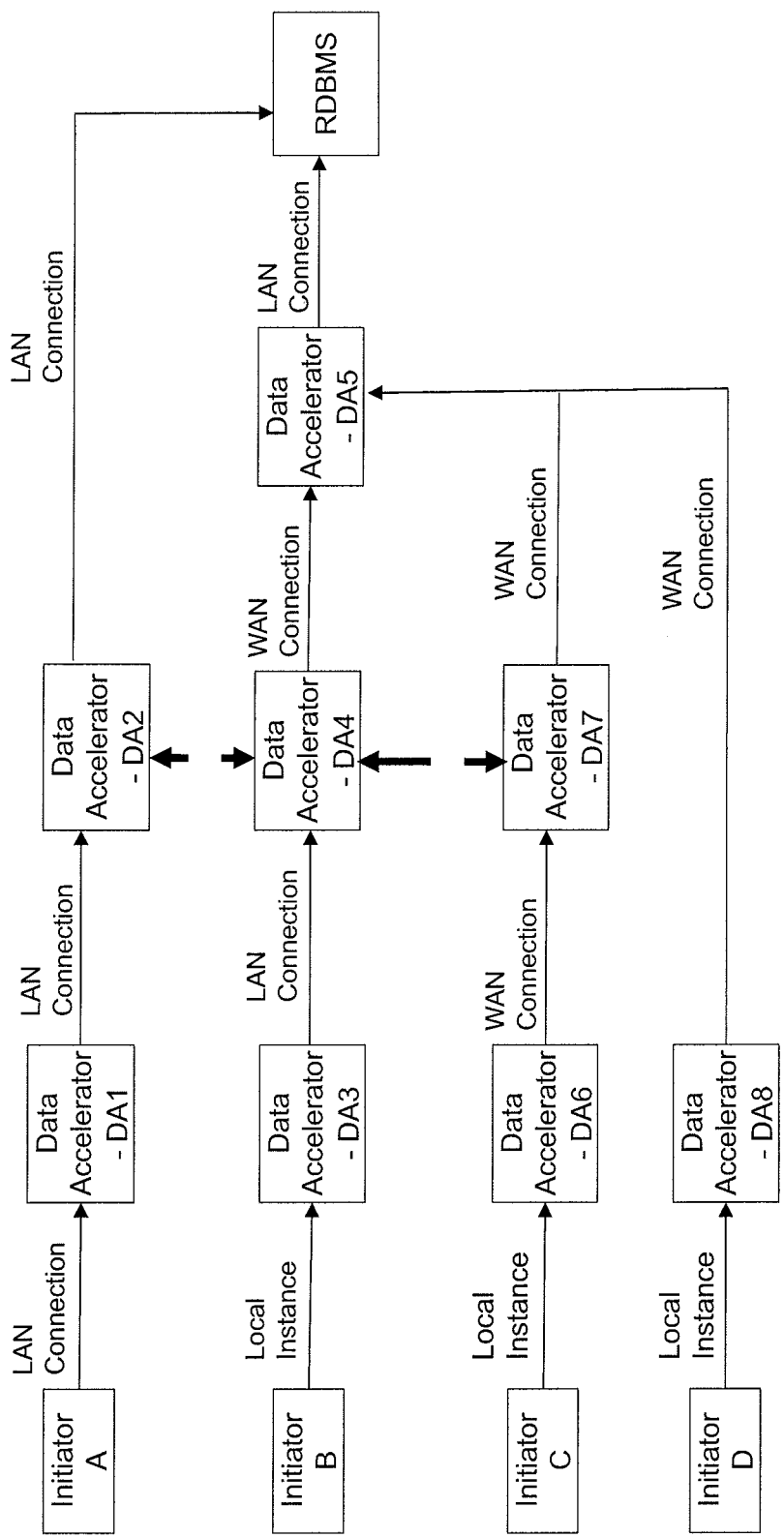
FIG. 22 shows a number of different configurations that instances can have to connect to a DBMS.

Because the Data Accelerator can work and share information in this peer-to-peer way or via the instance chain, it can build a powerful network of shared data and knowledge. FIG. 22 shows a number of different configurations that instances can have to connect to a DBMS. If each of the initiators runs the same query, initiator A runs it for the first time so DA 1 and DA2 both store it in their caches. Then initiator B sends the request. It has a local instance of Data Accelerator and that doesn't contain the response in cache and because of the network configuration it cannot talk to DA1. The request is forwarded to DA4. DA4 has a network link to DA2 and DA7 so it sends a control packet to both instances to see if they have the request. DA1 returns the response and DA4 then carries out the standard checks (is it allowed and has it expired). If the response is acceptable then it is returned to DA3 which sends it back to the initiator after caching the request itself. The initiator C then sends the request. Again DA6 does not have a copy so it forwards it to DA7, and DA7 does not have a copy but does have a link to DA4 which it knows has previously requested the query so it asks DA4 for the response. DA4 returns the response from its own cache. DA7 verifies and sends back to DA6 which caches the result and returns it to the initiator. At this point if initiator C resends the request it is served immediately from DA6. The initiator D then sends the request. DA8 does not have it in cache and has no peers it can connect to so forwards it on to DA5. This instance also does not have it in cache, but it does have a downstream instance that has the response but the link downstream is a slow WAN link so it needs to make a decision as to whether to send the request back down the link to DA4 or to send it to the DBMS. This decision is based on how long the query took to run on the server, how much data is in the response and how slow the WAN link is between DA4 and DA5.

Figure 23:
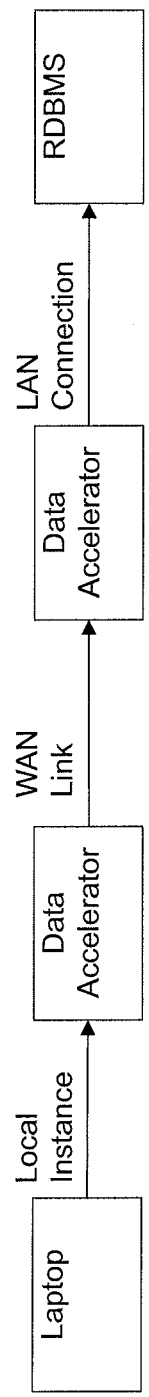
FIG. 23 shows the Data Accelerator instance chain when the laptop is out of the office.
Figure 24:
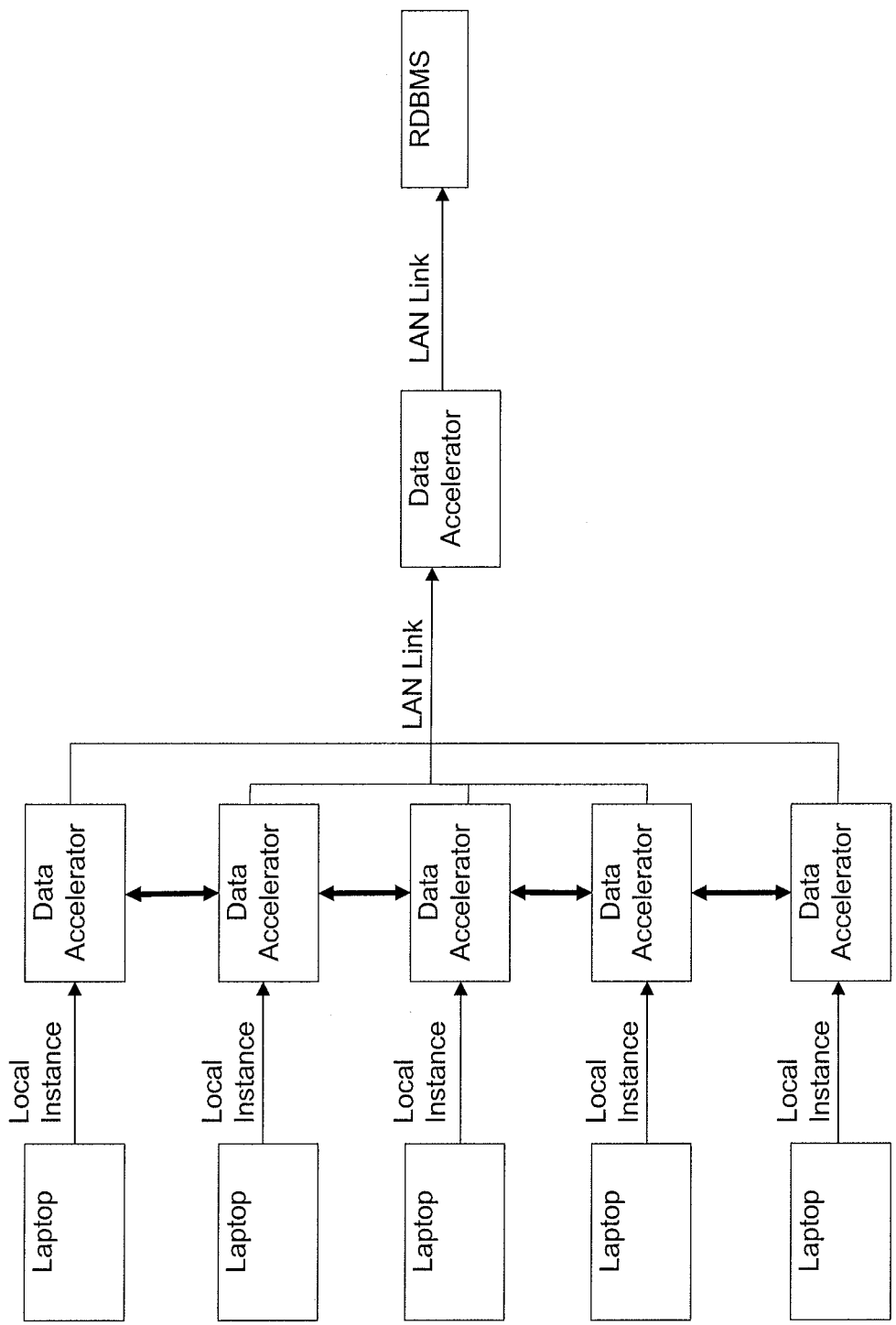
FIG. 24 shows how the instance, when in the office shares information and data with its peers.

Another scenario for the Data Accelerator is in a sales office where the salesmen have laptops. Each laptop has a local instance and when they are on the road this is mainly used for compressing the data. When the laptops are in the office, they can share their caches with the other laptops in the office. FIG. 23 shows the Data Accelerator instance chain when the laptop is out of the office and FIG. 24 shows how the instance, when in the office shares information and data with its peers.

Figure 25:
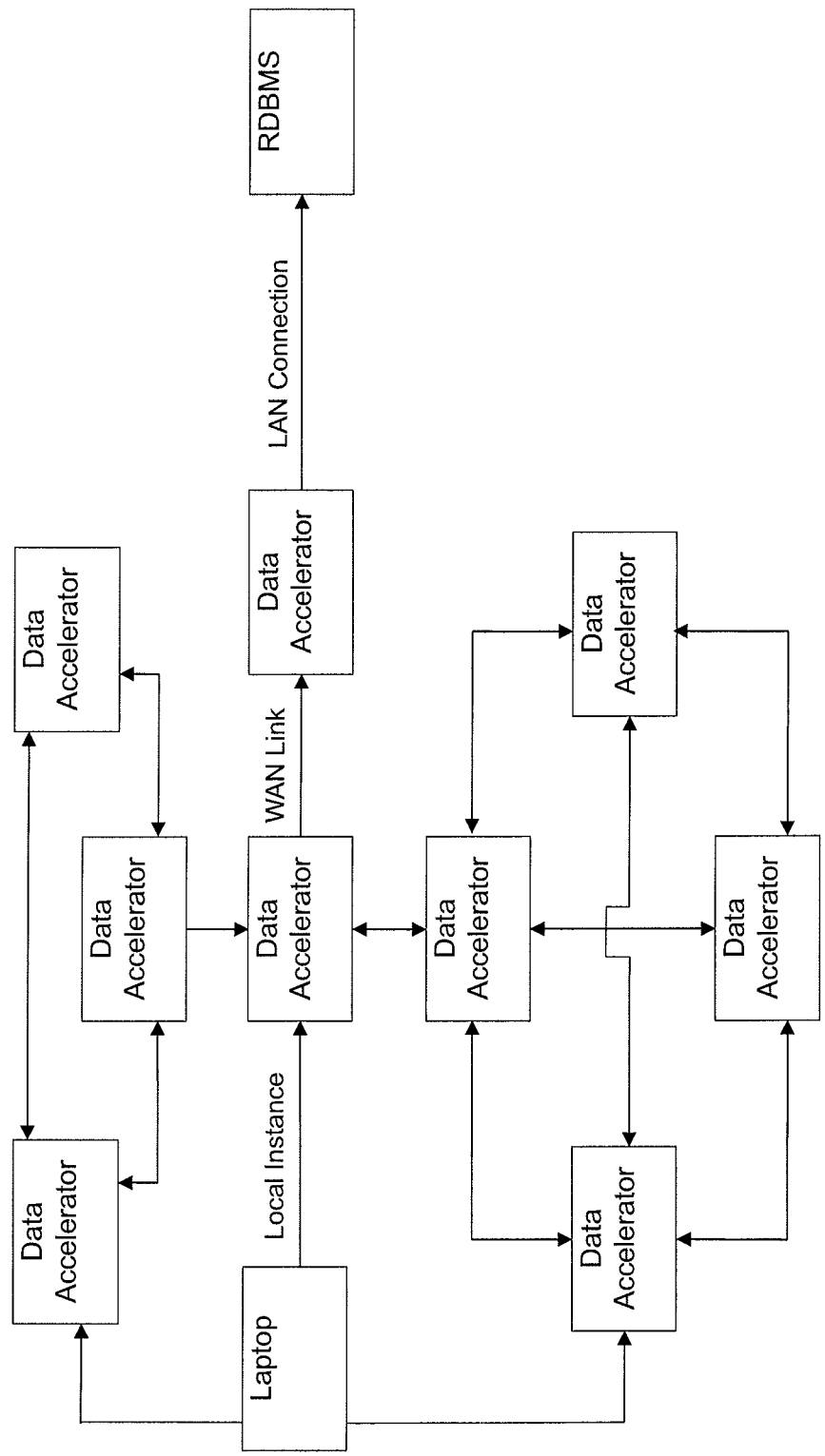
FIG. 25 shows a Data Accelerator instance that includes a WAN link.
Figure 26:
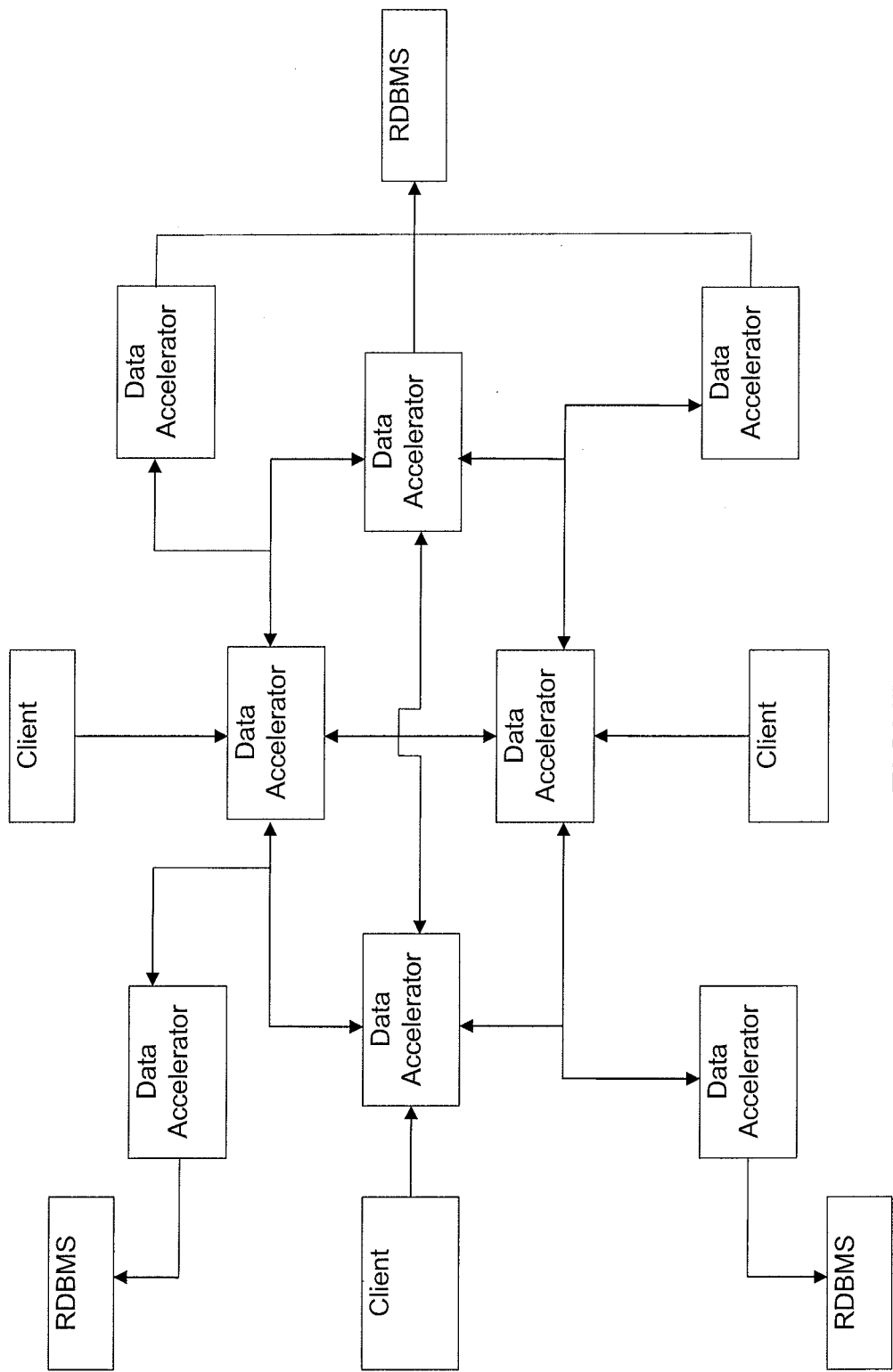
FIG. 26 shows an example of a configuration.
Figure 27:
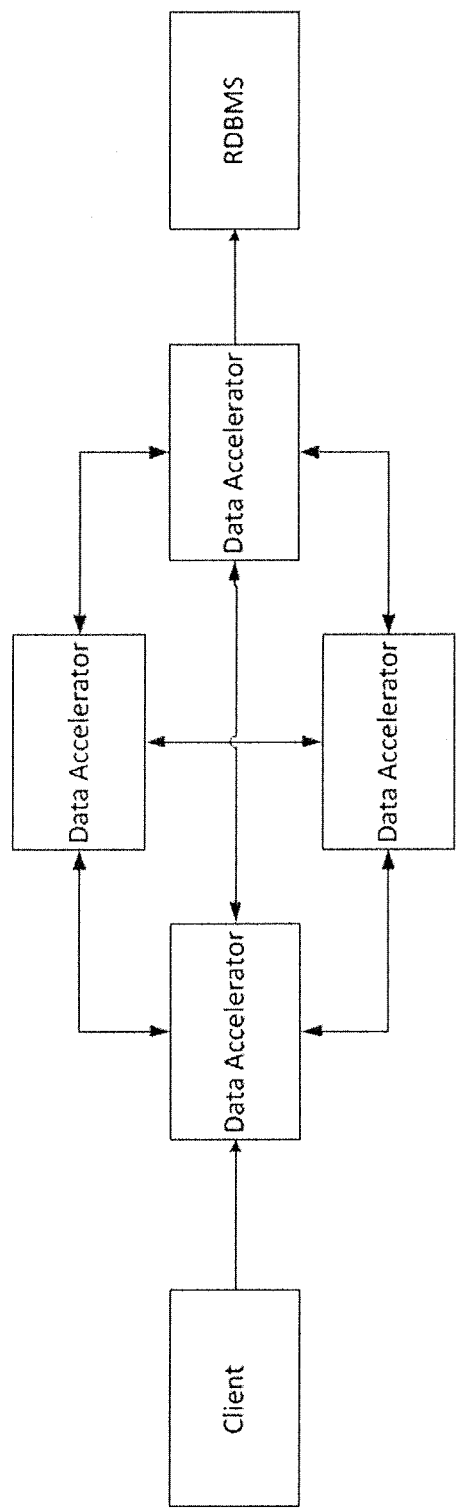
FIG. 27 shows an example of a configuration.

The links that the Data Accelerator can work over can be local connections so the instance runs on the initiators computer as a windows service, a UNIX daemon or whatever type of process is best for the underlying operating system. It can run over LAN links which are typically fast or it can run over slower WAN links (e.g. in FIG. 25) or links over public networks in cloud based systems. When running over unsecure networks the Data Accelerator can use encryption to secure both the requests and response data.

Section F: Use Cases

Finally if we take a look at the different applications for the Data Accelerator we can see who may use it and in what situations.

Examples for Use Cases for Data Accelerator:

Data Accelerator can use the techniques described to help reduce the amount of queries that a database server has to make in order to produce the required results. This could be by serving the entire request from Cache or by requesting only portions of the information that has changed. Also clients can get the cached results from other clients using peer to peer.

An example of this may be a huge multi-terabyte database containing information from a supermarket's store card usage. When a team or internal staff are mining data from the database in order to track trends of customers or products, they may need to repeat many of the same queries but each time with some additional or different information required. By caching the results of the requests each time a team member runs a query they only need the database server to return any new results that no one else has already requested. With such a large database there is a significant amount of time required for each query and these apply significant load to the database server. This could mean that if a report is made up of 100 queries that each take around 30 seconds to complete, without Data Accelerator the time to run a report or mine the required data is 50 minutes. But if the first 80 queries are cacheable and take sub-second to respond through data accelerator, the queries complete in 11 minutes and 20 seconds.

Another example of how Data Accelerator can reduce the load on a database server is for a reporting application. An organisation has a large database with a record of new and historical customer purchases. Each week the managers within the organisation run a report of the purchases made and compare that to historical data. Normally the database server would have to return all of the data required for the reports. Using Data Accelerator when a user runs the report they can access all the historical data from cached queries that have been run before, and the database server is only accessed to run a small query for the current week's data.

When a database server is replicating to other database servers or if it is running a backup Data Accelerator can be used to reduce the need for existing data or portions of data to be requested from the database server. This can result in a significant reduction in the load on a database server as the only queries that are run on the database are for data that has been added or changed since the last replication or backup.

Figure 28:
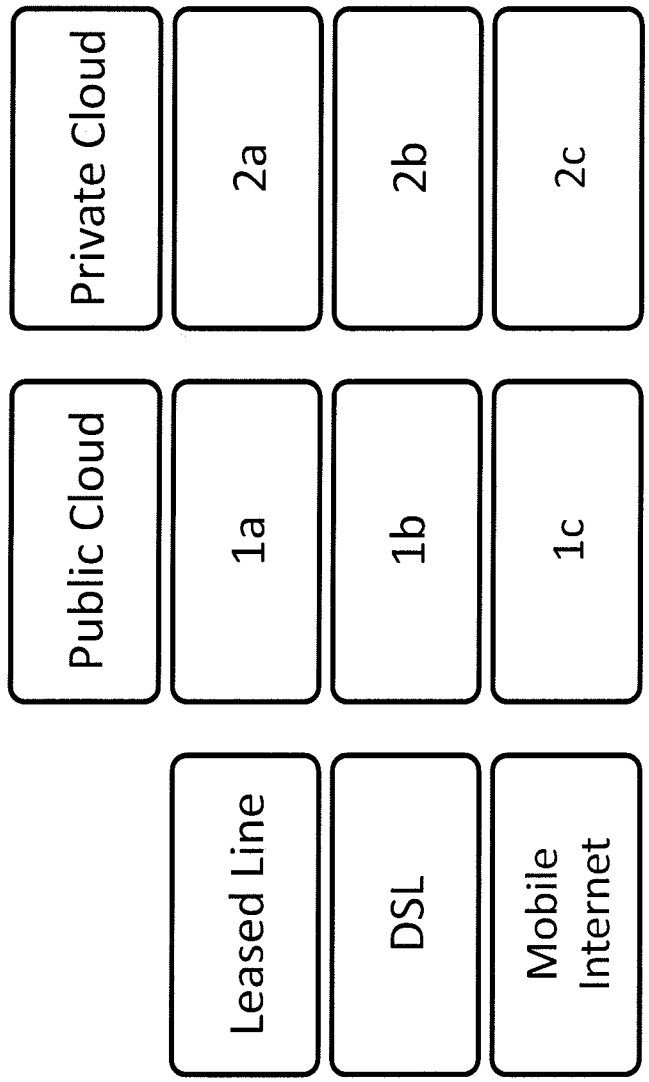
FIG. 28 shows a table of examples for use cases for Data Accelerator.

The second main use for Data Accelerator is to help reduce the load on the connection from the client application to the database servers. This is achieved by using the various techniques described for each connection that the client makes to the database server, and eliminating the need for the connection where possible. By being able to improve the performance of the connection between the client and the database server it is possible to move the database server from a local network connection onto a slower WAN connection. This could mean that the database server is moved into a public datacentre or public cloud environment or for an enterprise it may mean that the database server is able to be centralised into a private datacentre or private cloud environment. For either a public or private datacentre or cloud Data Accelerator will deliver improved performance and lower costs for all types of connection speeds. FIG. 28 shows a matrix of various scenarios; an example for each scenario is given below.

Example 1a

See FIG. 28

A university may have its application that tracks students' submissions of work and results currently running with a database server on each campus and the use of a Remote Desktop connection for students to log in from remote locations. The application without Data Accelerator is too slow to work without a high-speed local network connection between the client application and the database server. The current infrastructure is very expensive to run and the experience for end users who connect remotely is very poor.

By using Data Accelerator the database can be moved into a public cloud that provides low cost infrastructure and the campus locations and remote users or students can access the data using the client application on their local machine. To simplify the deployment of the client software application streaming can be used from a web page deployment. A typical use is for a tutor to download a student's essay, which is stored in a binary format inside the database, so it can be marked. When the tutor is at home and using a DSL connection, it can take the tutor up to 5 minutes per essay but with the Data Accelerator using the rules to optimize the traffic, the same request can take as little as 25 seconds.

Example 1b

See FIG. 28

Car repair garages require software to accurately estimate the cost of repairing damage to a vehicle and this price must be in correlation with amount the insurance companies are prepared to pay for such a repair. In order to cost a job there is an industry database with all part costs and labour estimates. Currently each car repair workshop has to install a database server as the application is too slow when running over a WAN connection. For example to open a contact and an estimate takes 44 seconds on a local network and 1 minute 53 seconds on a WAN connection. The problem with having a database server in each car repair workshop is that it is costly to install and maintain and also it is complex to update the database each month with the latest database. By using Data Accelerator the database can be moved into a public cloud environment but the performance of the application can be nearly the same as with a local server. The example above would only take 49 seconds over a standard ADSL connection with Data Accelerator.

Example 1c

See FIG. 28

If a user is accessing an application over a mobile broadband, 3G or GPRS connection the problems caused by slow WAN performance are increased significantly. So if a user wanted to access the database server over a mobile broadband connection with the example above it would take several minutes on without Data Accelerator. With Data Accelerator it is possible to deliver near local network performance even over a very slow GPRS connection. This would apply to many types of applications that are used by mobile users, for example sales quotation applications.

Private Cloud

Enterprise organisations are more likely to want to centralise database servers into an internal private datacentre or private cloud.

Example 2a

See FIG. 28

An example of this would be a healthcare application for recording doctors practise records about patient visits, appointments and bills. This application would currently require a server to be installed in each physical location. For a large hospital group this could mean a large number of servers on large hospital sites, servers in each practise which may include some rural locations, and many other ancillary buildings. The cost of deploying and managing this large number of database servers would be very significant. Even if each building were connected using a high-speed leased line, the problems caused by latency and general lack of bandwidth are enough to make the application unusable without a local database server. With Data Accelerator it is possible to remove all database servers and to maybe even downgrade some connections, then having a single database server or a server farm located in a private cloud environment. This would result is a significant reduction in costs.

Example 2b

See FIG. 28

An example of an application with a connection using a standard DSL line to a private cloud would be a Veterinary Clinic that has multiple branches with the animal database located at the head office. The Clinic is connected to head office over an ADSL line that has a maximum speed of 2.9 Mega Bits per second. The request to get animal history screen consists or 4 requests, 3 cacheable, 1 not. Without compression and caching it takes 2 minutes to open the history screen. With caching and compressions, after the details have been loaded once it only takes 5 seconds; the first time without caching but with compression takes 1 minute.

Example 2c

See FIG. 28

As mentioned above any of these examples would be even more affected by the connection performance when used on a mobile Internet connection (3G, GPRS etc.) Using Data Accelerator would also mean the mobile users would be able to access the application. This could be on either a laptop with a data card or even on a version of the application that runs on a smart phone or mobile phone device.

An additional benefit of Data Accelerator is that for connections that have any kind or packet loss or unreliability, especially mobile Internet connections that are affected by network coverage, the connection is automatically re-established and the application can carry on working once the connection is working again. Normally many applications will crash or end if the connection is dropped even for a short time. By having Data Accelerator intercepting the connection it can prevent the application from being aware of the connection problem.

Section G: Additional Uses

The process of intercepting DBMS requests, decomposing the request and applying a set of rules to improve the performance can also be applied to other systems outside of DBMS specific requests. Two other types of system include opening files over a network and web or HTTP requests.

The performance of opening files stored on a remote file server (which is anything that can store files) across a slow network is often poor and the difference between that and of opening files when they are local to the requestor is very noticeable. The data accelerator can decompose the requests for files from a file requestor (anything that can request a file—and hence includes end-users, applications, databases etc.) and pass the request to the rules engine which can apply any rules that are appropriate to improve the responsiveness of the client application. For example when a client requests a list of all the files in a directory on a remote share that is located over a slow or unsecure link the Data Accelerator can apply the following rules:

The cache serve rule to see if it already has a list which it can immediately return The cache serve rule can also see if a file was in cache but has changed and request the portions of the file which have changed to minimise the cost of re-caching the data The cache date rule to cache the response so it is available for future requests The pre cache rule can request all the files in the directory so they are immediately available when a future request is made The compression rule can apply compression to the file so that the data that is needed can be requested as quickly as possible The encryption rule can be applied so documents and files can be carried securely over a public network.

A real world example of this would be a human resources (HR) department in a global blue chip company: the HR officers will store both general forms and also documents that relate to specific employees which vary in size and are confidential such as appraisal documents and details of behavioural and misconduct cases against employees. The HR officers will be based in remote offices and often travel to other offices and require fast access to the documents. Using the Data Accelerator means that the documents can be stored in one secure location and the users can access documents quickly and securely over remote links.

Web requests (from, generically, a 'web data requestor') can also apply the same set of rules that file requests can use because many webs requests contain static data which do not change such as images, documents and code files like html or CSS files. Traditional web caching services work by determining whether or not a resource has changed since it was last requested by using the If-Modified-Since HTTP header, whereas the Data Accelerator can be more forceful in applying more complex rules for example with a standard HTTP Get request that returns a html page, some images and some links:

The pre-cache rule can determine which images are required for the page and request them before the client does The pre-cache rule can follow the links on the page and request those pages so that they are already in cache if the requestor follows a link.

The cache serve rule can determine whether to serve something from cache based on actual content rather than the web servers last modified time.

The cache serve rule can also request portions of files which have changed as opposed to the complete file We can also apply the standard rules to:

The compression rule can compress in situations where the web server is not configured to compress data and smarter compression algorithms can compress data further than HTTP compression that typically uses gzip, reducing the time it takes to send it over the network.

The encryption rule can provide secure communication over the public internet without the need to use HTTPS/SSL on the client or web server, easing the management on the server and the security on the client.

An example of where a company that might employ the data accelerator to optimize web requests could be a publisher who keeps an electronic copy of their books in html format. Users who are remote can read the books but without the Data Accelerator there is often a delay for the next page and for images in the book. The Data Accelerator can use the pre-caching rule to automatically start downloading the next page or chapter so that it is immediately available as well as downloading the images required. The full suite of rules can also be applied so the request and response is compressed and encrypted so it can be carried over public networks.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The general direction of the App Accelerator and the Data Accelerator is to be able to allow any device anywhere to download and run data driven applications in a simple manner, i.e. the "Download and Run Architecture". There are three main approaches to supporting any type of device and these are in brief:

Using the requests that have been sent through the Data Accelerator to automatically build an applications data access layer in whatever the target language is, such as objective-c for the iOS platform, Java for the android platform or C# for the Windows platform. This enables software publishers to quickly deploy existing applications to new platforms as they only need to write the user interface layer.

Using App Accelerator to run the application on a platform that is already supported by the application and displaying the user interface on the device, this gives publishers the simplest route to deploying applications but does require some investment in servers to run App Accelerator on.

Using App Accelerator to provide a fully virtualized OS, so applications designed to run on one OS can be run under a separate OS with the App Accelerator proving the OS functions that the application requires and translating those into the functions of the underlying OS.

The invention claimed is:

1. A method comprising:
routing query data from a client to a database server through an optimisation system implemented on a computing device;
routing response data corresponding to the query data provided by the database server from the database server to the optimisation system;
decoding, by the optimisation system, the query data and/or the response data to generate content and/or context data of the query data and/or the response data, the content and/or the context data specifying how the client and/or the server understands the query data and/or the response data;
analysing, by the optimisation system, the query data;
applying rules, by the optimisation system, to the response data that is routed to the optimisation system from the database server based on analysis of the query data, in order to generate optimised response data at the optimisation system and speed up interaction between the client and the database server, wherein the rules are applied to the response data and the optimised response data is generated after the response data has been generated by the database server and after the response data has been provided to the optimisation system from the database server.

2. The method of claim 1, wherein the query data includes an actual query that the client has asked to be run or a request for data that the client has asked for.

3. The method of claim 1, wherein context of the query data includes whether a query, included as part of the query data, is a part of a series of requests generated by the client and relationships between the requests.

4. The method of claim 1, wherein context of the query data includes environmental details including which server a request included as part of the query data is going to, which user and workstation sent the request, and network link speeds.

5. The method of claim 1, further comprising determining, by the optimisation system based on context of the response data, effectiveness of specific rules applied to specific requests, in order to either change parameters of the rules or enable or disable one or more of the rules.

6. The method of claim 1, further comprising optimising the interaction between the client and the database server to enable a practical connection to be made over a slow link or a high latency link.

7. The method of claim 6, wherein optimising the interaction between the client and the database server further includes speeding up flow of data, causing cessation of the flow of data, obviating a need for data to flow, or managing the flow of data.

8. The method of claim 6, wherein the slow link or the high latency link is over a wide area network or the Internet.

9. The method of claim 1, wherein the query data and the response data include database management server requests and responses.

10. The method of claim 1, wherein the rules are applied based on factors including initiator and server addresses or locations, time of day, configuration, server load, and a combination of these.

11. The method of claim 1, wherein the rules are applied at different points in a request/response stream.

12. The method of claim 1, further comprising: generating the optimised response data by compressing the response data at the optimisation system after the response data has been generated by the database server and after the response data has been provided to the optimisation system.

13. The method of claim 1, further comprising: generating the optimised response data by encrypting the response data at the optimisation system after the response data has been generated by the database server and after the response data has been provided to the optimisation system.

14. The method of claim 1, wherein the optimisation system is implemented on the same computing device as the client, wherein a second optimisation system is implemented on a computing device of the database server and wherein the optimisation system and the second optimisation system are separated by a wide area network (WAN) link.

15. The method of claim 14, further comprising routing the response data through the second optimisation system and routing the optimised response data across the WAN to the optimisation system.

16. The method of claim 15, further comprising compressing the response data at the second optimisation system and decompressing the optimised response data at the optimisation system.

17. The method of claim 16, further comprising encrypting the response data at the second optimisation system and decrypting the optimised response data at the optimisation system.

18. A system comprising:
one or more processors;
memory;
a client coupled to the one or more processors and the memory;
a database server coupled to the one or more processors and the memory, the database server including database server software configured to receive query data generated by the client;
an optimisation system coupled between the client, the database server, the one or more processors, and the memory, the optimisation system configured to:
receive the query data from the client and send the query data to the database server;
receive response data corresponding to the query data from the database server;
decode the query data and/or the response data to generate content and/or context data of the query data and/or the response data, the content and/or the context data specifying how the client and/or the server understands the query data and/or the response data;
analyse the query data received from the client;
apply rules to the response data that is received from the database server based on the analysis of the query data in order to generate optimised response data at the optimisation system, and speed up interaction between the client and the database server software, wherein the rules are applied to the response data and the optimised response data is generated after the response data has been generated by the database server and after the response data has been provided to the optimisation system from the database server.

19. The system of claim 18, wherein the query data includes an actual query that the client has asked to be run or a request for data that the client has asked for.

20. The system of claim 18, wherein context of the query data is selected from a group consisting of whether a query, included as part of the query data, is a part of a series of requests generated by the client, a relationship between the requests, and a combination of these.

21. The system of claim 18, wherein context of the query data includes environmental details selected from a group consisting of which server a request included as part of the query data is going to, which user and workstation sent the request, network link speeds, and a combination of these.

22. The system of claim 18, wherein the optimisation system is further configured to determine effectiveness of specific rules applied to specific requests based on context of the response data in order to either change the parameters of the rules or enable or disable one or more of the rules.

23. The system of claim 18, wherein the optimisation system is further configured to optimise the interaction between the client and the database server software to enable a practical connection to be made over a slow link or a high latency link including the Internet, optimising the interaction further including speeding up flow of data between the client and the database server software, causing the cessation of the flow of data, obviating the need for data to flow, or managing the flow of data.

24. The system of claim 18, wherein the query data and the response data include database management server requests and responses.

25. The system of claim 18, wherein the optimisation system is further configured to apply the rules based on factors including initiator and server addresses or locations, time of day, configuration, and server load.

26. The system of claim 18, wherein the optimisation system is further configured to apply the rules at different points in a request/response stream.

27. An optimization system comprising:
means for routing query data from a client to database server software of a database server through an optimisation system implemented on a computing device;
means for routing response data corresponding to the query data provided by the database server software to the optimisation system,
means for decoding the query data and/or the response data to generate content and/or context data of the query data and/or the response data, the content and/or the context data specifying how the client and/or the server understands the query data and/or the response data;
means for analysing the query data;
means for applying rules to the response data based on analysis of the query data, in order to generate optimised response data and speed up interaction between the client and the database server software, wherein the rules are applied to the response data and the optimised response data is generated after the response data has been generated by the database server and after the response data has been provided to the optimisation system from the database server.

* * * * *